United States Patent
Nelsen et al.

(10) Patent No.: US 10,068,287 B2
(45) Date of Patent: Sep. 4, 2018

(54) SYSTEMS AND METHODS TO MANAGE AND CONTROL USE OF A VIRTUAL CARD

(76) Inventors: David A. Nelsen, Lake Oswego, OR (US); Michael J. Fletcher, Beaverton, OR (US)

( * ) Notice: Subject to any disclaimer, the term of this patent is extended or adjusted under 35 U.S.C. 154(b) by 399 days.

(21) Appl. No.: 13/158,349

(22) Filed: Jun. 10, 2011

(65) Prior Publication Data

US 2011/0307377 A1 Dec. 15, 2011

Related U.S. Application Data

(60) Provisional application No. 61/354,113, filed on Jun. 11, 2010.

(51) Int. Cl.
*G06Q 40/00* (2012.01)
*G06Q 40/02* (2012.01)
*G06Q 20/10* (2012.01)
*G06Q 20/34* (2012.01)

(52) U.S. Cl.
CPC .......... *G06Q 40/02* (2013.01); *G06Q 20/105* (2013.01); *G06Q 20/348* (2013.01); *G06Q 20/351* (2013.01); *G06Q 20/3578* (2013.01)

(58) Field of Classification Search
CPC ..................................................... G06Q 40/00
USPC ......................................................... 705/35
See application file for complete search history.

(56) References Cited

U.S. PATENT DOCUMENTS

| | | |
|---|---|---|
| 3,553,440 A | 1/1971 | Dale |
| 4,482,802 A | 11/1984 | Aizawa et al. |
| 4,734,858 A | 3/1988 | Schlafly |
| 4,747,049 A | 5/1988 | Richardson et al. |
| 4,877,947 A | 10/1989 | Mori |
| 4,900,904 A | 2/1990 | Wright et al. |
| 4,908,521 A | 3/1990 | Boggan et al. |
| 4,943,707 A | 7/1990 | Boggan |

(Continued)

FOREIGN PATENT DOCUMENTS

| | | |
|---|---|---|
| EP | 0950968 A1 | 10/1999 |
| EP | 1519332 A | 3/2005 |

(Continued)

OTHER PUBLICATIONS

Wikipedia, "outsourcing" pages NPL 2014 definition.*

(Continued)

*Primary Examiner* — Kirsten Sachwitz Apple
(74) *Attorney, Agent, or Firm* — Landmark Intellectual Property, PLLC

(57) ABSTRACT

Systems and methods are provided for creating and using versions of a shared virtual card. In one example, a system for sharing stored value is provided. The system may include a virtual card manager configured to manage one or more shared virtual cards and a first computing device including a virtual card engine executable by a processor to manage the shared virtual card. The first computing device may be communicatively coupled to the virtual card manager via a network. In the example, stored value of the shared virtual card may be split between a first version and a second version. The first version may receive a first portion of the stored value and the second version may receive a second portion of the stored value; the first version available for use on the first computing device and the second version available for use on a second computing device.

4 Claims, 8 Drawing Sheets

(56) References Cited

U.S. PATENT DOCUMENTS

| | | |
|---|---|---|
| 5,117,355 A | 5/1992 | Mccarthy |
| 5,202,826 A | 4/1993 | Mccarthy |
| 5,256,863 A | 10/1993 | Ferguson |
| 5,274,845 A | 12/1993 | Wang |
| 5,311,424 A | 5/1994 | Mukherjee |
| 5,350,906 A | 9/1994 | Brody et al. |
| 5,367,148 A | 11/1994 | Storch |
| 5,375,240 A | 12/1994 | Grundy |
| 5,383,113 A | 1/1995 | Kight et al. |
| 5,500,513 A | 3/1996 | Langhans et al. |
| 5,511,114 A | 4/1996 | Stimson et al. |
| 5,578,808 A | 11/1996 | Taylor |
| 5,581,064 A | 12/1996 | Riley |
| 5,590,038 A | 12/1996 | Pitroda |
| 5,619,559 A | 4/1997 | Kennedy |
| 5,621,201 A | 4/1997 | Langhans et al. |
| 5,671,279 A | 9/1997 | Elgamal |
| 5,699,528 A | 12/1997 | Hogan |
| 5,734,719 A | 3/1998 | Tsvedos |
| 5,799,285 A | 8/1998 | Klingman |
| 5,850,217 A | 12/1998 | Cole |
| 5,857,175 A | 1/1999 | Day |
| 5,873,072 A | 2/1999 | Kight et al. |
| 5,878,401 A | 3/1999 | Joseph |
| 5,884,271 A | 3/1999 | Pitroda |
| 5,889,270 A | 3/1999 | Van Haagen |
| 5,903,878 A | 5/1999 | Talati et al. |
| 5,907,142 A | 5/1999 | Kelsey |
| 5,913,210 A | 6/1999 | Call |
| 5,918,213 A | 6/1999 | Bernard |
| 5,950,173 A | 9/1999 | Perkowski |
| 5,953,710 A * | 9/1999 | Fleming ................ 705/38 |
| 5,968,110 A | 10/1999 | Vvestrope |
| 5,984,508 A | 11/1999 | Hurley |
| 5,991,413 A | 11/1999 | Arditti et al. |
| 5,991,749 A | 11/1999 | Morrill, Jr. |
| 5,991,750 A | 11/1999 | Watson |
| 6,000,608 A | 12/1999 | Dorf |
| 6,012,049 A | 1/2000 | Kawan |
| 6,021,397 A | 2/2000 | Jones et al. |
| 6,025,780 A | 2/2000 | Bowers |
| 6,029,139 A | 2/2000 | Cunningham |
| 6,029,141 A | 2/2000 | Bezos |
| 6,029,151 A | 2/2000 | Nikander |
| 6,032,133 A | 2/2000 | Hilt et al. |
| 6,032,135 A | 2/2000 | Molano et al. |
| 6,038,549 A | 3/2000 | Davis et al. |
| 6,039,244 A | 3/2000 | Finstrewald |
| 6,049,778 A | 4/2000 | Walker |
| 6,055,511 A | 4/2000 | Luebbering |
| 6,055,567 A | 4/2000 | Ganesan et al. |
| 6,062,472 A | 5/2000 | Cheung |
| 6,070,150 A | 5/2000 | Remington et al. |
| 6,085,167 A | 7/2000 | Iguchi |
| 6,108,642 A | 8/2000 | Findley |
| 6,119,164 A | 9/2000 | Basche |
| 6,125,352 A | 9/2000 | Franklin |
| 6,134,533 A | 10/2000 | Shell |
| 6,138,106 A | 10/2000 | Walker et al. |
| 6,138,911 A | 10/2000 | Fredregil |
| 6,142,369 A | 11/2000 | Jonstromer |
| 6,148,249 A | 11/2000 | Newman |
| 6,158,657 A | 12/2000 | Hall, III et al. |
| 6,169,890 B1 | 1/2001 | Vatanen |
| 6,175,823 B1 | 1/2001 | Van Dusen |
| 6,185,545 B1 | 2/2001 | Resnick et al. |
| 6,189,787 B1 | 2/2001 | Dorf |
| 6,219,652 B1 | 4/2001 | Carter |
| 6,222,914 B1 | 4/2001 | McMullin |
| 6,240,397 B1 | 5/2001 | Sachs |
| 6,256,690 B1 | 7/2001 | Carper |
| 6,285,749 B1 | 9/2001 | Manto |
| 6,289,322 B1 | 9/2001 | Kitchen et al. |
| 6,295,522 B1 | 9/2001 | Boesch |
| 6,314,171 B1 | 11/2001 | Dowens |
| 6,324,525 B1 | 11/2001 | Kramer et al. |
| 6,327,577 B1 | 12/2001 | Garrison et al. |
| 6,330,544 B1 | 12/2001 | Walker et al. |
| 6,334,116 B1 | 12/2001 | Ganesan et al. |
| 6,363,362 B1 | 3/2002 | Burfield et al. |
| 6,363,364 B1 | 3/2002 | Nel |
| 6,366,893 B2 | 4/2002 | Hannula et al. |
| 6,424,706 B1 | 7/2002 | Katz et al. |
| 6,442,532 B1 | 8/2002 | Kawan |
| 6,494,367 B1 | 12/2002 | Zacharias |
| 6,542,933 B1 | 4/2003 | Durst |
| 6,550,672 B1 | 4/2003 | Tracy |
| 6,575,361 B1 | 6/2003 | Graves et al. |
| 6,591,098 B1 | 7/2003 | Shieh et al. |
| 6,594,644 B1 | 7/2003 | Van Dusen |
| 6,609,113 B1 | 8/2003 | O'Leary et al. |
| 6,615,189 B1 | 9/2003 | Phillips et al. |
| 6,622,015 B1 | 9/2003 | Himmel et al. |
| 6,636,833 B1 | 10/2003 | Flitcroft |
| 6,648,222 B2 | 11/2003 | Mcdonald et al. |
| 6,651,885 B1 | 11/2003 | Arias |
| 6,659,259 B2 | 12/2003 | Knox et al. |
| 6,675,153 B1 | 1/2004 | Cook et al. |
| 6,678,664 B1 | 1/2004 | Ganesan |
| 6,684,269 B2 | 1/2004 | Wagner |
| 6,705,520 B1 | 3/2004 | Pitroda et al. |
| 6,736,314 B2 | 5/2004 | Cooper et al. |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,834,796 B2 | 12/2004 | Anvekar et al. |
| 6,836,765 B1 | 12/2004 | Sussman |
| 6,836,962 B2 | 1/2005 | Khandros et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,868,391 B1 | 3/2005 | Hultgren |
| 6,886,742 B2 | 5/2005 | Stoutenburg et al. |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,975,937 B1 | 12/2005 | Kantarjilev |
| 6,988,657 B1 | 1/2006 | Singer et al. |
| 6,993,510 B2 * | 1/2006 | Guy et al. ................ 705/68 |
| 7,003,499 B2 | 2/2006 | Arditti et al. |
| 7,014,107 B2 | 3/2006 | Singer et al. |
| 7,016,863 B1 | 3/2006 | Kamakura |
| 7,024,396 B2 | 4/2006 | Woodward |
| 7,054,842 B2 | 5/2006 | James et al. |
| 7,072,854 B2 | 7/2006 | Loeser |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,086,586 B1 * | 8/2006 | Sullivan ................ 235/379 |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,191,939 B2 | 3/2007 | Beck et al. |
| 7,209,889 B1 | 4/2007 | Whitfield |
| 7,222,101 B2 | 5/2007 | Bishop et al. |
| 7,229,006 B2 | 6/2007 | Babbi et al. |
| 7,229,014 B1 | 6/2007 | Snyder |
| 7,249,054 B2 | 7/2007 | Keil |
| 7,249,097 B2 | 7/2007 | Hutchison |
| 7,252,226 B2 | 8/2007 | Risafi et al. |
| 7,281,653 B2 | 10/2007 | Beck et al. |
| 7,292,998 B2 | 11/2007 | Graves et al. |
| 7,316,350 B2 | 1/2008 | Algiene |

(56) References Cited

U.S. PATENT DOCUMENTS

| | | | |
|---|---|---|---|
| 7,328,190 B2 | 2/2008 | Smith et al. | |
| 7,356,327 B2 | 4/2008 | Cai et al. | |
| 7,383,226 B2 | 6/2008 | Kight et al. | |
| 7,400,883 B2 * | 7/2008 | Rivers et al. | 455/414.1 |
| 7,415,617 B2 | 8/2008 | Ginter | |
| 7,437,328 B2 | 10/2008 | Graves et al. | |
| 7,519,543 B2 | 4/2009 | Ota | |
| 7,590,557 B2 | 9/2009 | Harrison | |
| 7,631,803 B2 * | 12/2009 | Peyret et al. | 235/380 |
| 7,653,599 B2 | 1/2010 | Doran et al. | |
| 7,690,580 B2 | 4/2010 | Shoemaker | |
| 7,725,326 B1 | 5/2010 | Tracy | |
| 7,735,724 B2 | 6/2010 | Fujita | |
| 7,757,944 B2 * | 7/2010 | Cline et al. | 235/383 |
| 7,774,209 B2 | 8/2010 | James et al. | |
| 7,840,437 B2 | 11/2010 | Lewis | |
| 7,860,790 B2 * | 12/2010 | Monk | 705/39 |
| 7,905,399 B2 | 3/2011 | Barnes et al. | |
| 7,917,386 B2 | 3/2011 | Christensen | |
| 7,940,333 B2 | 3/2011 | Perkowski | |
| 7,925,285 B2 * | 4/2011 | Indirabhai | 455/502 |
| 7,959,076 B1 | 6/2011 | Hopkins | |
| 8,109,436 B1 | 2/2012 | Hopkins | |
| 8,152,060 B2 | 4/2012 | Wolfe et al. | |
| 8,152,061 B2 | 4/2012 | Wolfe et al. | |
| 8,195,568 B2 | 6/2012 | Singhal | |
| 8,245,910 B2 | 8/2012 | Sullivan et al. | |
| 8,267,313 B2 | 9/2012 | Harper et al. | |
| 8,321,302 B2 | 11/2012 | Bauer et al. | |
| 8,332,277 B2 | 12/2012 | Mccaffery et al. | |
| 8,332,323 B2 | 12/2012 | Stals | |
| 8,355,982 B2 | 1/2013 | Hazel | |
| 8,371,502 B1 | 2/2013 | Galit et al. | |
| 8,500,007 B2 | 8/2013 | Wolfe et al. | |
| 8,631,999 B2 | 1/2014 | Wolfe et al. | |
| 8,662,387 B1 | 3/2014 | Geller | |
| 8,676,672 B2 | 3/2014 | Nelsen | |
| 2001/0001856 A1 | 5/2001 | Gould et al. | |
| 2001/0005840 A1 | 6/2001 | Verkama | |
| 2001/0007983 A1 | 7/2001 | Lee | |
| 2001/0011248 A1 | 8/2001 | Himmel et al. | |
| 2001/0034720 A1 | 10/2001 | Armes | |
| 2001/0037264 A1 | 11/2001 | Husemann | |
| 2001/0042785 A1 | 11/2001 | Walker et al. | |
| 2001/0044776 A1 | 11/2001 | Kight et al. | |
| 2001/0056410 A1 | 12/2001 | Ishigaki | |
| 2002/0002535 A1 | 1/2002 | Kitchen et al. | |
| 2002/0010627 A1 | 1/2002 | Lerat | |
| 2002/0010677 A1 | 1/2002 | Kitchen et al. | |
| 2002/0013768 A1 | 1/2002 | Ganesan | |
| 2002/0016749 A1 | 2/2002 | Borecki et al. | |
| 2002/0019809 A1 | 2/2002 | Kitchen et al. | |
| 2002/0022472 A1 | 2/2002 | Watler et al. | |
| 2002/0046165 A1 | 4/2002 | Kitchen et al. | |
| 2002/0046166 A1 | 4/2002 | Kitchen et al. | |
| 2002/0046167 A1 | 4/2002 | Kitchen et al. | |
| 2002/0046168 A1 | 4/2002 | Kitchen et al. | |
| 2002/0049672 A1 | 4/2002 | Kitchen et al. | |
| 2002/0052840 A1 | 5/2002 | Kitchen et al. | |
| 2002/0052841 A1 | 5/2002 | Guthrie et al. | |
| 2002/0060243 A1 | 5/2002 | Janiak et al. | |
| 2002/0062282 A1 | 5/2002 | Kight et al. | |
| 2002/0065773 A1 | 5/2002 | Kight et al. | |
| 2002/0065774 A1 | 5/2002 | Young et al. | |
| 2002/0077993 A1 | 6/2002 | Immonen et al. | |
| 2002/0095387 A1 | 7/2002 | Sosa et al. | |
| 2002/0095420 A1 | 7/2002 | Hovsepian | |
| 2002/0107791 A1 | 8/2002 | Nobrega | |
| 2002/0111906 A1 | 8/2002 | Garrison et al. | |
| 2002/0116329 A1 | 8/2002 | Serbetcioglu et al. | |
| 2002/0120571 A1 | 8/2002 | Maung et al. | |
| 2002/0128968 A1 | 9/2002 | Kitchen et al. | |
| 2002/0138450 A1 | 9/2002 | Kremer | |
| 2002/0152123 A1 | 10/2002 | Giordano et al. | |
| 2002/0152160 A1 | 10/2002 | Allen-Rouman et al. | |
| 2002/0152179 A1 | 10/2002 | Racov | |
| 2002/0153414 A1 | 10/2002 | Stoutenburg et al. | |
| 2002/0169713 A1 | 11/2002 | Chang et al. | |
| 2002/0174016 A1 * | 11/2002 | Cuervo | 705/16 |
| 2002/0178062 A1 | 11/2002 | Wright et al. | |
| 2002/0190123 A1 | 12/2002 | Anvekar et al. | |
| 2002/0198737 A1 | 12/2002 | Valtanen | |
| 2003/0004802 A1 | 1/2003 | Callegari | |
| 2003/0004891 A1 | 1/2003 | Van Rensburg et al. | |
| 2003/0004894 A1 | 1/2003 | Rowney | |
| 2003/0023552 A1 | 1/2003 | Kight et al. | |
| 2003/0028481 A1 | 2/2003 | Flitcroft et al. | |
| 2003/0046249 A1 | 3/2003 | Wu | |
| 2003/0055735 A1 | 3/2003 | Cameron et al. | |
| 2003/0074328 A1 | 4/2003 | Schiff et al. | |
| 2003/0088462 A1 | 5/2003 | Carrithers et al. | |
| 2003/0093366 A1 | 5/2003 | Halfer | |
| 2003/0115126 A1 | 6/2003 | Pitroda | |
| 2003/0126079 A1 | 7/2003 | Roberson | |
| 2003/0141358 A1 | 7/2003 | Hudson | |
| 2003/0162565 A1 | 8/2003 | Ai-Khaja | |
| 2003/0167207 A1 | 9/2003 | Berardi et al. | |
| 2003/0172039 A1 * | 9/2003 | Guy et al. | 705/68 |
| 2003/0191711 A1 | 10/2003 | Jamison et al. | |
| 2003/0200184 A1 | 10/2003 | Dominguez et al. | |
| 2003/0204457 A1 | 10/2003 | Arias | |
| 2003/0212601 A1 | 11/2003 | Silva et al. | |
| 2003/0212796 A1 | 11/2003 | Willard | |
| 2003/0218062 A1 | 11/2003 | Noriega et al. | |
| 2003/0218066 A1 | 11/2003 | Fernandes et al. | |
| 2003/0220884 A1 | 11/2003 | Choi et al. | |
| 2003/0226042 A1 | 12/2003 | Fukushima | |
| 2003/0229590 A1 | 12/2003 | Byrne et al. | |
| 2003/0233317 A1 | 12/2003 | Judd | |
| 2003/0233318 A1 | 12/2003 | King et al. | |
| 2004/0010462 A1 | 1/2004 | Moon et al. | |
| 2004/0019564 A1 | 1/2004 | Goldthwaite et al. | |
| 2004/0019568 A1 | 1/2004 | Moenickheim et al. | |
| 2004/0029569 A1 | 2/2004 | Khan et al. | |
| 2004/0039639 A1 | 2/2004 | Walker et al. | |
| 2004/0049456 A1 | 3/2004 | Dreyer | |
| 2004/0049458 A1 | 3/2004 | Kunugi et al. | |
| 2004/0054587 A1 | 3/2004 | Dev et al. | |
| 2004/0059671 A1 | 3/2004 | Nozaki et al. | |
| 2004/0064409 A1 | 4/2004 | Kight et al. | |
| 2004/0068446 A1 | 4/2004 | Do et al. | |
| 2004/0068448 A1 | 4/2004 | Kim | |
| 2004/0078327 A1 | 4/2004 | Frazier et al. | |
| 2004/0083170 A1 | 4/2004 | Bam et al. | |
| 2004/0083171 A1 | 4/2004 | Kight et al. | |
| 2004/0093305 A1 | 5/2004 | Kight et al. | |
| 2004/0094624 A1 | 5/2004 | Fernandes et al. | |
| 2004/0107170 A1 | 6/2004 | Labrou et al. | |
| 2004/0117302 A1 | 6/2004 | Weichert et al. | |
| 2004/0118914 A1 | 6/2004 | Smith et al. | |
| 2004/0128197 A1 | 7/2004 | Bam et al. | |
| 2004/0139005 A1 | 7/2004 | Ganesan | |
| 2004/0139318 A1 | 7/2004 | Fiala et al. | |
| 2004/0159700 A1 | 8/2004 | Khan et al. | |
| 2004/0162058 A1 | 8/2004 | Mottes | |
| 2004/0164145 A1 | 8/2004 | Licciardello et al. | |
| 2004/0167853 A1 | 8/2004 | Sharma | |
| 2004/0181463 A1 | 9/2004 | Goldthwaite et al. | |
| 2004/0199431 A1 | 10/2004 | Ganesan et al. | |
| 2004/0199474 A1 | 10/2004 | Ritter | |
| 2004/0210449 A1 | 10/2004 | Breck et al. | |
| 2004/0215560 A1 | 10/2004 | Amalraj et al. | |
| 2004/0215564 A1 | 10/2004 | Lawlor et al. | |
| 2004/0224660 A1 | 11/2004 | Anderson | |
| 2004/0225605 A1 | 11/2004 | Rowe | |
| 2004/0230489 A1 | 11/2004 | Goldthwaite et al. | |
| 2004/0232225 A1 | 11/2004 | Bishop et al. | |
| 2004/0242208 A1 | 12/2004 | Teicher | |
| 2004/0243490 A1 | 12/2004 | Murto et al. | |
| 2004/0249710 A1 | 12/2004 | Smith | |
| 2004/0249766 A1 | 12/2004 | Ganesan et al. | |
| 2004/0260647 A1 | 12/2004 | Blinn et al. | |
| 2004/0267664 A1 | 12/2004 | Nam et al. | |
| 2004/0267665 A1 | 12/2004 | Nam et al. | |

(56) References Cited

U.S. PATENT DOCUMENTS

| | | |
|---|---|---|
| 2005/0001027 A1 | 1/2005 | Bahar |
| 2005/0015388 A1 | 1/2005 | Dasgupta et al. |
| 2005/0021457 A1* | 1/2005 | Johnson et al. ............... 705/39 |
| 2005/0027624 A1 | 2/2005 | Cai |
| 2005/0060261 A1 | 3/2005 | Remington et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0080634 A1 | 4/2005 | Kanniainen et al. |
| 2005/0080693 A1 | 4/2005 | Foss et al. |
| 2005/0086164 A1 | 4/2005 | Kim et al. |
| 2005/0092828 A1 | 5/2005 | Phillips et al. |
| 2005/0092829 A1 | 5/2005 | Phillips et al. |
| 2005/0096981 A1 | 5/2005 | Shimada |
| 2005/0097038 A1 | 5/2005 | Yu et al. |
| 2005/0103839 A1 | 5/2005 | Hewel |
| 2005/0108121 A1 | 5/2005 | Gravett et al. |
| 2005/0109835 A1 | 5/2005 | Jacoby et al. |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0154670 A1 | 7/2005 | Heitz et al. |
| 2005/0174975 A1 | 8/2005 | Mgrdechian et al. |
| 2005/0177437 A1 | 8/2005 | Ferrier |
| 2005/0177517 A1 | 8/2005 | Leung |
| 2005/0182714 A1 | 8/2005 | Nel |
| 2005/0184145 A1 | 8/2005 | Law et al. |
| 2005/0187873 A1 | 8/2005 | Labrou et al. |
| 2005/0197919 A1 | 9/2005 | Robertson |
| 2005/0199705 A1 | 9/2005 | Beck et al. |
| 2005/0199706 A1 | 9/2005 | Beck et al. |
| 2005/0199709 A1 | 9/2005 | Linlor |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0242171 A1 | 11/2005 | Smets et al. |
| 2005/0247777 A1 | 11/2005 | Pitroda |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini |
| 2006/0000900 A1 | 1/2006 | Fernandes et al. |
| 2006/0004656 A1 | 1/2006 | Lee |
| 2006/0006226 A1 | 1/2006 | Fitzgerald et al. |
| 2006/0026070 A1 | 2/2006 | Sun |
| 2006/0058011 A1 | 3/2006 | Vanska |
| 2006/0074767 A1 | 4/2006 | Fortney et al. |
| 2006/0078100 A1 | 4/2006 | Risafi et al. |
| 2006/0080232 A1 | 4/2006 | Epps |
| 2006/0085310 A1 | 4/2006 | Mylet et al. |
| 2006/0089893 A1 | 4/2006 | Joseph et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0163343 A1 | 7/2006 | Changryeol |
| 2006/0167744 A1 | 7/2006 | Yoo |
| 2006/0206436 A1 | 9/2006 | James et al. |
| 2006/0213980 A1 | 9/2006 | Geller et al. |
| 2006/0224454 A1 | 10/2006 | Kantor et al. |
| 2006/0255125 A1 | 11/2006 | Jennings |
| 2006/0261150 A1 | 11/2006 | Seifert et al. |
| 2006/0277146 A1 | 12/2006 | Dively et al. |
| 2007/0017976 A1 | 1/2007 | Peyret et al. |
| 2007/0021969 A1 | 1/2007 | Homeier-Beals |
| 2007/0055785 A1 | 3/2007 | Stevens |
| 2007/0100761 A1 | 5/2007 | Dillon |
| 2007/0114274 A1 | 5/2007 | Gibbs |
| 2007/0130085 A1 | 6/2007 | Zhu |
| 2007/0162337 A1 | 7/2007 | Hawkins et al. |
| 2007/0162369 A1* | 7/2007 | Hardison, III .............. 705/35 |
| 2007/0174166 A1* | 7/2007 | Jones ........................ 705/35 |
| 2011/0060904 A9 | 7/2007 | Whitfield |
| 2007/0175984 A1 | 8/2007 | Khandaker et al. |
| 2007/0175985 A1 | 8/2007 | Barnes et al. |
| 2007/0179865 A1 | 8/2007 | Hibler et al. |
| 2007/0185782 A1 | 8/2007 | Shooks et al. |
| 2007/0185820 A1 | 8/2007 | Talker |
| 2007/0198347 A1 | 8/2007 | Muldoon |
| 2007/0203788 A1 | 8/2007 | Andalib et al. |
| 2007/0208618 A1 | 9/2007 | Paintin |
| 2007/0210152 A1 | 9/2007 | Read |
| 2007/0214080 A1 | 9/2007 | Babi et al. |
| 2007/0233615 A1 | 10/2007 | Tumminaro |
| 2007/0244872 A1 | 10/2007 | Hancock |
| 2007/0257767 A1 | 11/2007 | Beeson |
| 2007/0262140 A1* | 11/2007 | Long, Sr. ................ 235/380 |
| 2007/0272743 A1 | 11/2007 | Christie et al. |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0033817 A1 | 2/2008 | Billmaier et al. |
| 2008/0040265 A1 | 2/2008 | Rackley |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0070690 A1 | 3/2008 | Van Luchene |
| 2008/0071620 A1 | 3/2008 | Lowe |
| 2008/0091545 A1 | 4/2008 | Jennings, Jr. et al. |
| 2008/0097844 A1 | 4/2008 | Hsu et al. |
| 2008/0097851 A1 | 4/2008 | Bemmel et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0162299 A1 | 7/2008 | Gusler et al. |
| 2008/0162341 A1 | 7/2008 | Zimmer et al. |
| 2008/0172306 A1 | 7/2008 | Schorr et al. |
| 2008/0172331 A1 | 7/2008 | Graves et al. |
| 2008/0255942 A1 | 10/2008 | Craft |
| 2008/0290987 A1 | 11/2008 | Li |
| 2009/0001159 A1 | 1/2009 | James et al. |
| 2009/0006116 A1 | 1/2009 | Baker |
| 2009/0030789 A1 | 1/2009 | Mashinsky |
| 2009/0037326 A1 | 2/2009 | Chitti |
| 2009/0055296 A1 | 2/2009 | Nelsen |
| 2009/0106115 A1 | 4/2009 | James |
| 2009/0112709 A1 | 4/2009 | Barhydt et al. |
| 2009/0132415 A1 | 5/2009 | Davis et al. |
| 2009/0173782 A1 | 7/2009 | Muscato |
| 2009/0173784 A1 | 7/2009 | Yang |
| 2009/0182663 A1 | 7/2009 | Hurst |
| 2009/0192928 A1 | 7/2009 | Abifaker |
| 2009/0254432 A1 | 10/2009 | Mccaffery et al. |
| 2009/0281941 A1* | 11/2009 | Worth ......................... 705/39 |
| 2009/0281951 A1* | 11/2009 | Shakkarwar ................ 705/67 |
| 2009/0287558 A1 | 11/2009 | Seth |
| 2009/0298427 A1 | 12/2009 | Wilkinson et al. |
| 2009/0327121 A1 | 12/2009 | Carroll |
| 2010/0008535 A1 | 1/2010 | Abulafia |
| 2010/0042471 A1 | 2/2010 | Chang |
| 2010/0057554 A1 | 3/2010 | Lanford |
| 2010/0057580 A1 | 3/2010 | Raghunathan |
| 2010/0063906 A1* | 3/2010 | Nelsen et al. ................ 705/30 |
| 2010/0076833 A1* | 3/2010 | Nelsen ..................... 705/14.25 |
| 2010/0082487 A1 | 4/2010 | Nelsen |
| 2010/0088188 A1* | 4/2010 | Kumar et al. ................ 705/17 |
| 2010/0097180 A1 | 4/2010 | Cardullo |
| 2010/0130172 A1 | 5/2010 | Vendrow et al. |
| 2010/0174993 A1 | 7/2010 | Pennington |
| 2010/0185505 A1 | 7/2010 | Sprogoe |
| 2010/0198726 A1 | 8/2010 | Doran et al. |
| 2010/0280906 A1 | 11/2010 | Lim et al. |
| 2010/0299266 A1 | 11/2010 | Catania |
| 2010/0312636 A1 | 12/2010 | Coulter et al. |
| 2011/0071913 A1 | 3/2011 | Chakiris et al. |
| 2011/0091092 A1 | 4/2011 | Nepomniachtchi |

(56) References Cited

U.S. PATENT DOCUMENTS

| | | |
|---|---|---|
| 2011/0106698 A1 | 5/2011 | Isaacson et al. |
| 2011/0145044 A1 | 6/2011 | Nelsen et al. |
| 2011/0166992 A1 | 7/2011 | Dessert et al. |
| 2011/0238549 A1 | 9/2011 | Poon |
| 2012/0099780 A1 | 4/2012 | Smith |
| 2012/0234911 A1 | 9/2012 | Yankovich |
| 2012/0271689 A1 | 10/2012 | Etheredge |
| 2012/0284185 A1 | 11/2012 | Mettler |
| 2012/0290366 A1 | 11/2012 | Giles |
| 2012/0323787 A1 | 12/2012 | Nelsen |

FOREIGN PATENT DOCUMENTS

| | | |
|---|---|---|
| EP | 1519332 A1 | 3/2005 |
| GB | 2333878 A | 8/1999 |
| JP | 2002318951 | 10/2002 |
| JP | 2002318951 A | 10/2002 |
| KR | 10-2001-0106187 A | 11/2001 |
| KR | 20040028487 | 4/2004 |
| KR | 20040028487 A | 4/2004 |
| KR | 20040052531 A | 6/2004 |
| KR | 1020040052502 | 6/2004 |
| KR | 1020040052502 A | 6/2004 |
| KR | 20040069294 | 8/2004 |
| KR | 20040069294 A | 8/2004 |
| KR | 10-2005-0118609 A | 12/2005 |
| KR | 20090123444 A | 12/2009 |
| WO | 0231708 A | 4/2002 |
| WO | 2004/012118 A1 | 2/2004 |
| WO | 2004012118 A1 | 2/2004 |
| WO | 2005111882 A1 | 11/2005 |
| WO | 2008/005018 A2 | 1/2008 |
| WO | 2008005018 A | 1/2008 |

OTHER PUBLICATIONS

ISA Korean Intellectual Property Office, International Search Report of PCT/US2009/056118, dated Apr. 19, 2010, 3 pages.
ISA Korean Intellectual Property Office, International Search Report of PCT/US2009/058111, dated May 26, 2010, 3 pages.
ISA United States Patent and Trademark Office, International Search Report of PCT/US2008/073910, dated Nov. 10, 2008.
ISA Korean Intellectual Property Office, International Search Report of PCT/US2010/060875, dated Jul. 29, 2011, 10 pages.
Eazel, William, "Paypal Intros SMS payments," http://www.v3.co.uk/articles/print/20152694, vnunet.com Mar. 24, 2006, 1 page.
Nelsen, David A., "Systems and Methods for Reassignment of a Virtual Card," U.S. Appl. No. 13/107,654, filed May 13, 2011, 49 pages.
ISA European Patent Office, Extended European Search Report of EP09812328, dated Jul. 4, 2012, Germany, 6 pages.
Eazel, William, "PayPal intros SMS payments," http://www.v3.co.uk/articles/print/2152694, Mar. 24, 2006, Accessed Dec. 31, 2009
Nelsen, David A., "Systems and Methods for Fixed Form Card to Virtual Card Communication," U.S. Appl. No. 13/525,062, filed Jun. 15, 2012, 62 pages.

\* cited by examiner

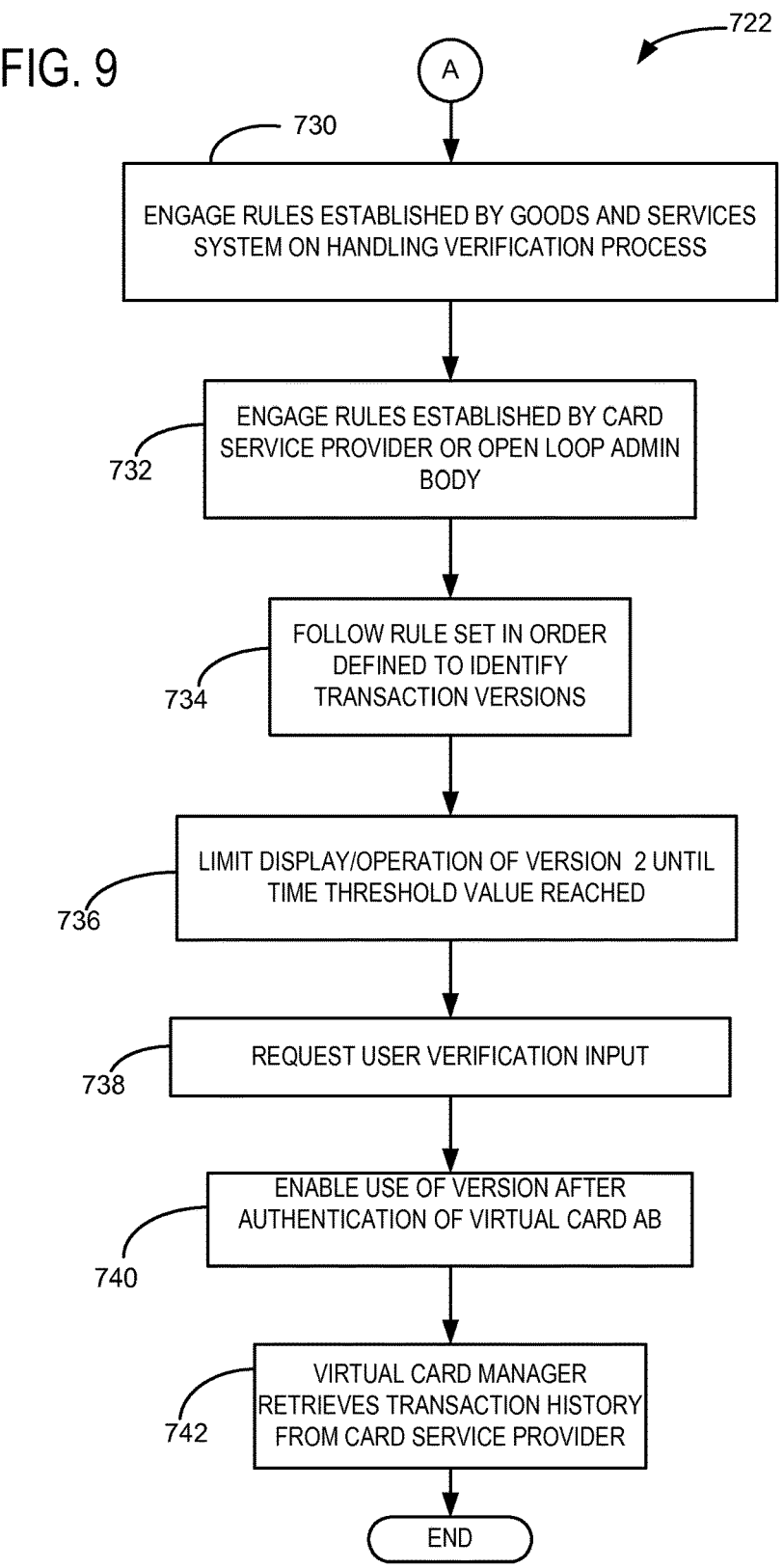

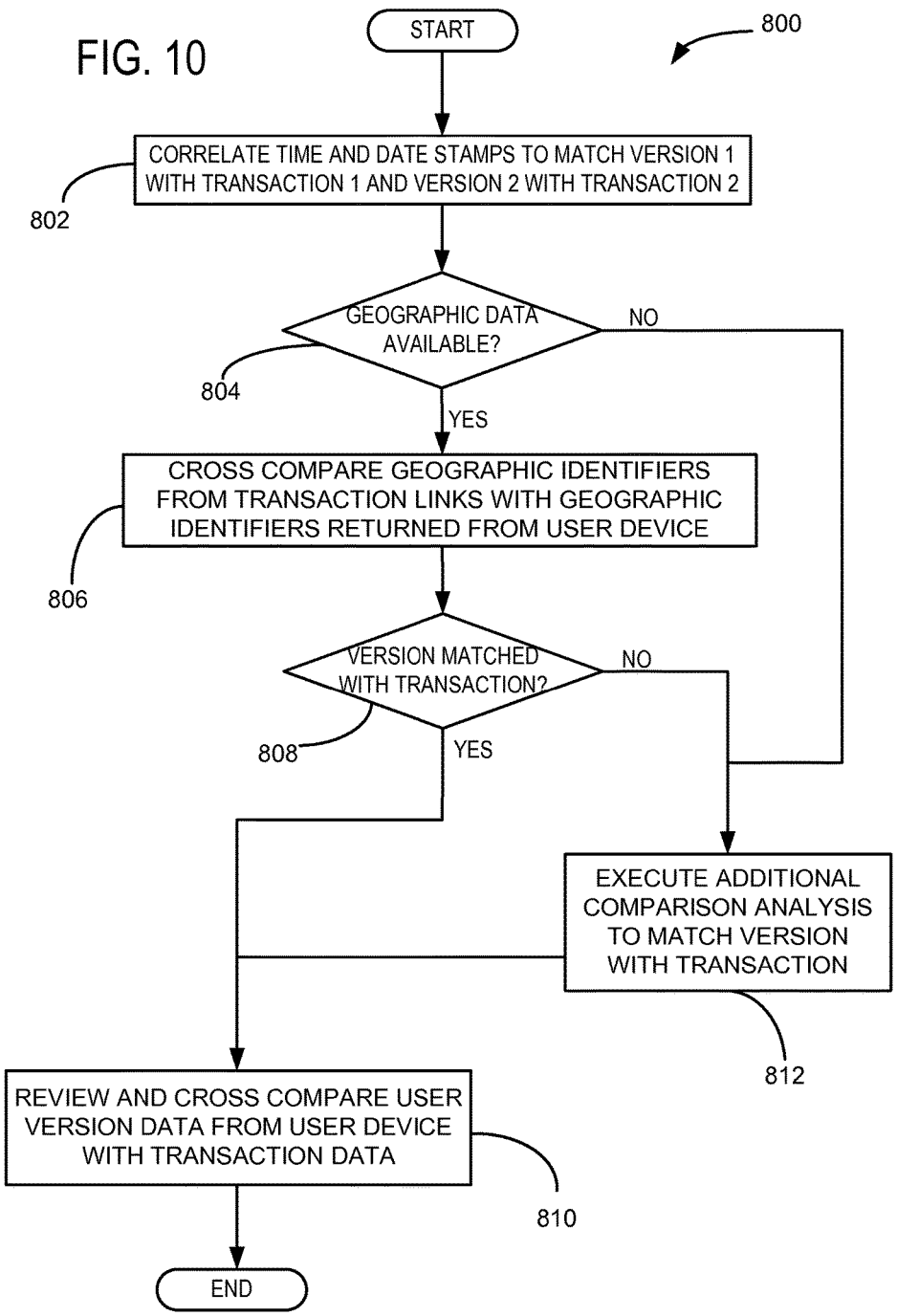

SYSTEMS AND METHODS TO MANAGE AND CONTROL USE OF A VIRTUAL CARD

CROSS REFERENCE TO RELATED APPLICATION

This application claims priority to U.S. Provisional Application No. 61/354,113, filed Jun. 11, 2010, and titled SYSTEMS AND METHODS TO MANAGE AND CONTROL USE OF A VIRTUAL CARD. The entirety of the above listed application is incorporated herein by reference for all purposes.

FIELD

The present disclosure relates generally to systems and methods to manage and control use of a virtual card, specifically systems and methods to manage a shared virtual card and system and methods to control use of virtual cards.

BACKGROUND AND SUMMARY

Plastic gift cards have become a popular form of payment in today's marketplace. Consumers typically purchase a select goods and services system's gift card and then present the plastic gift card to a brick and mortar location for redemption. However, there are many difficulties in managing a large number of plastic cards maintained by a consumer. Due to the number of these cards that a consumer may manage, consumers may physically stretch their wallets to carry the large number of cards and it may be difficult to locate a desired plastic card for use due to the number of cards. With the large number of plastic cards carried by consumers, the consumer may desire to reduce the number of cards that are carried in the physical wallet or purse. However, when the plastic cards are not carried for use, in some examples, a consumer may lose the plastic gift card or fail to bring the plastic gift card to the brick and mortar store for redemption resulting in frustration with plastic gift cards.

The issuance of a plastic card also increases the potential for loss or misplacement of the card. Furthermore, fraudulent use of cards may occur if the card is lost and then redeemed by a third party. The fraudulent use of the cards may negatively affect the card holder, goods and services system, and/or the card service provider as well as the industry as a whole.

As the inventors herein have recognized the difficulties with the plastic issued cards, alternative methods and systems for electronic cards have been developed. These electronically-issued and managed cards are referred to herein as virtual cards. The virtual cards may include, but are not limited to, one or more of a virtual gift card, a virtual loyalty card, a virtual membership card, and a virtual rewards card.

As described in more detail below, the inventors herein have provided systems and methods for managing and controlling use of a virtual card. In some embodiments, a shared virtual card is disclosed including controls for managing use and security of the shared virtual card and versions of such a card. In other embodiments, additional control features, including use of geographic location information is provided to further enable controls and use of virtual cards, including shared virtual cards.

BRIEF DESCRIPTION OF THE FIGURES

The disclosure is illustrated by way of example and not by way of limitation in the figures of the accompanying drawings, in which the like references indicate similar elements and in which:

FIG. 9 further illustrates an embodiment of the example method of FIG. 8 and further illustrates an option for monitoring use of a version of a shared stored value card according to an embodiment of the present disclosure.

FIG. 10 illustrates an example method of comparing a transaction history with use data to identify a transaction according to an embodiment of the present disclosure.

DETAILED DESCRIPTION

As described in more detail below, systems and methods are provided for creating and using versions of a shared virtual card. As an example and not as a limitation, a virtual card manager may manage a plurality of third party systems, such as third party point of sale systems. Regardless of the type of third party system, the virtual card manager may enable sharing such that users may be able to selectively share a virtual card by sharing the stored value of the virtual card. As such, the virtual card may be split into one or more versions, wherein each version stores a portion of the original stored value. The virtual card system may manage the sharing such that the third party system recognizes the shared versions of the virtual card as stored value cards in their system. Thus, the virtual card management system enables sharing of virtual value cards and provides security to sharing of the virtual value cards regardless of the setup of the third party system. Further, the system may include a first computing device including a virtual card engine executable by a processor to manage the shared virtual card. The first computing device may be communicatively coupled to the virtual card manager via a network. As an example, stored value of the shared virtual card may be split between a first version and a second version. The first version may receive a first portion of the stored value and the second version may receive a second portion of the stored value; the first version available for use on the first computing device and the second version available for use on a second computing device.

Figure 1:
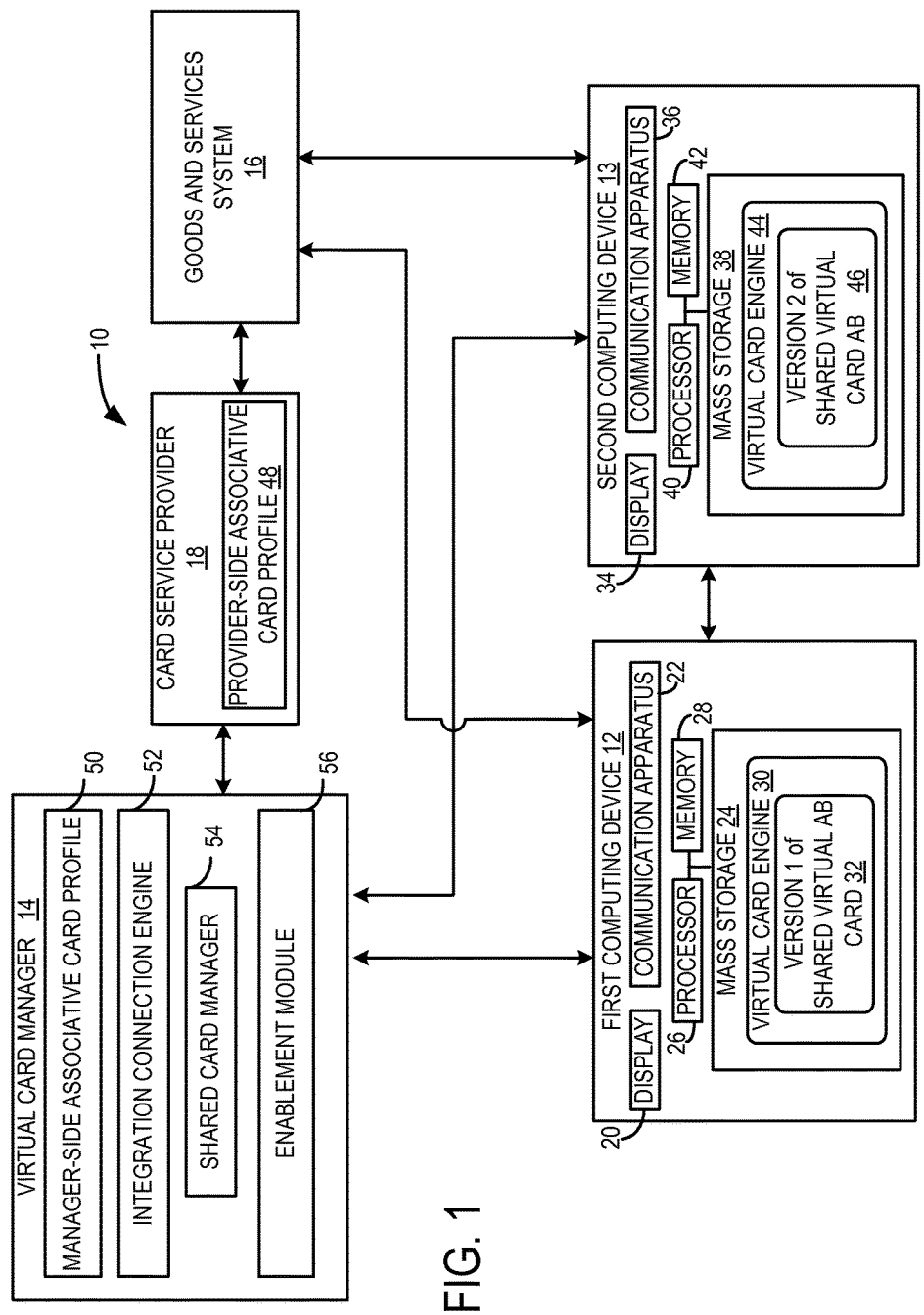
FIG. 1 shows an exemplary schematic illustration of a shared virtual card management system according to an embodiment of the present disclosure.

FIG. 1 shows an exemplary schematic illustration of a virtual card management system 10 according to an embodiment of the present disclosure. As described below, the system enables management and use of a shared virtual card.

Virtual card as used herein may be an electronically-issued and/or electronically maintained virtual value card. A virtual value may be any type of privilege, monetary or non-monetary. For example, a virtual value card may be a stored value card which may include, but is not limited to, a virtual gift card, a virtual loyalty card, a virtual rewards card, a prepaid card, or another suitable virtual card that holds prepaid value. The stored value card may have monetary or other forms of value stored on the virtual card. For example, the virtual card may be a monetary gift card to a specific merchant or group of merchants. In another example, a virtual value card may be a virtual membership card where such stored value includes membership privileges or identification-related privileges. An example of virtual membership cards may include, but are not limited to, virtual identification cards, club cards, promotional cards, identification cards (ID cards), etc. Depending on a merchant's business, a merchant may limit specific privileges to one or more types of virtual cards. For example, in some systems, a merchant may select to activate privileges only for virtual gift cards and not to virtual membership cards.

As depicted in FIG. 1, shared virtual card management system 10 may include a first computing device 12, a second computing device 13, a virtual card manager 14, at least one goods and services system 16, and in some systems, one or more card service providers 18. In a preferred embodiment, shared virtual card management system 10 may be configured as a closed loop card management system. However, it will be appreciated that shared virtual card management system 10 may additionally or alternatively be configured for an open loop card management system.

The first and second computing device may be suitable computing devices that enable a user to store and maintain one or more virtual cards. For example, the first and/or second computing device may be a smart phone, a hand-held computing device, a mobile device, a laptop computer, a portable media player, a desktop computer, etc. In some embodiments, the computing devices may run an identifiable operating system's software and provide a standardized interface and platform for applications. The computing devices may be networked to one or more networks, such as a public network (e.g. the Internet), to enable communication between the computing devices and other elements included in the virtual card management system.

The first computing device 12 may include a display 20 configured to present graphics on the device. The first computing device may also include a communication apparatus 22 facilitating wired and/or wireless communication between the computing device and external systems and devices (e.g., the virtual card manager, the goods and services system, and the card service provider) such as through a network (not shown). As depicted, the first computing device 12 may include various software applications stored on mass storage 24 (e.g., a hard drive, solid state memory, a rewritable disc, etc.,) and executable via a processor 26 using portions of memory 28. The mass storage 24 may include various programmatic elements such as a virtual card engine 30 configured to manage one or more virtual card(s) 32. As shown, the virtual card engine 30 may be configured to manage various versions of virtual card, such as the example version 1 of virtual AB card 32. The virtual card engine 30 may be a software application configured to implement various virtual card functions, discussed in greater detail herein.

Similar to first computing device 12, the second computing device 13 may include a display 34 configured to present graphics on the device. As mentioned above, the second computing device may also include a communication apparatus 36 facilitating wired and/or wireless communication between the second computing device and external systems and devices (e.g., the first computing device, the virtual card manager, the goods and services system, and/or the card service provider). As depicted the second computing device may include various software applications stored on mass storage 38 and executable via a processor 40 using portions of memory 42. The mass storage 38 may include various programmatic elements such as a virtual card engine 44 configured to manage one or more virtual card(s), including one or more versions of virtual card. As shown, virtual card engine 44 may be configured to manage a version of a shared virtual card 46, such as version 2 of shared virtual card AB. First computing device 12 and second computing device 13 may be coupled through a network to enable electronic communication between the two devices.

Figure 5:
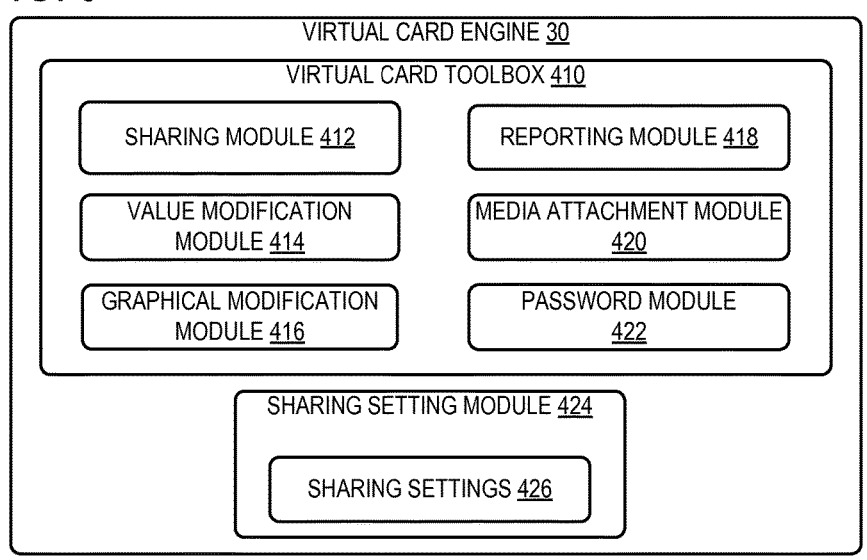
FIG. 5 shows an example virtual card engine that may be included in some embodiments of the virtual card management system shown in FIG. 1.

The virtual card engines 30 and 44 may be software applications configured to implement various virtual card functions to enable ease and use of virtual cards, such as shared virtual cards. Some of the virtual card functions may be implemented via various modules. FIG. 5, described below, provides example modules of a virtual card engine which may be used to manage the virtual cards. Management may include managing the versions of a shared virtual card and tracking use of the versions of a shared virtual card.

It should be appreciated that in some embodiments, a browser-based virtual card engine may be utilized. In other words, the virtual card engines may be executed on a remote Internet server accessible via the first and/or second computing devices. In some examples, when a browser-based virtual card engine is used, a card service provider or associated goods and services system may manage various characteristics of the virtual cards. Management of the characteristics and functions of the virtual cards may include tracking versions or characteristics to the virtual cards as made by a virtual card user. Limitations on versions or modifications of the characteristics may be managed by the virtual card manager and such limitations may be based on selections or capabilities of the goods and services system and/or the card service provider.

A shared virtual card, as used herein, may be any virtual card that provides value or a portion of value that is accessible through more than one computing device. As discussed above, a virtual card may be a virtual value card, such as virtual gift card or virtual membership card. Each virtual card may include one or more types of card data. Example card data, includes, but is not limited to identification (ID) number, a personal identification number (PIN), a stored value, a name, a bar code, image data (e.g., picture of a card holder or other image data), data corresponding to the associated goods and services system through which the card may be used, etc. Each split of the shared virtual value card may be considered a version of the shared virtual value card. In some examples, each version may have identical privileges. In other examples, versions may have different privileges which may be customized to the user or to the type of shared card.

Continuing with FIG. 1, the goods and services system 16 (also referred to generally as the merchant) may be a system configured to manage goods and services transactions. The merchant may be a store or other commercial establishment selling or providing goods and/or services that desires to have their card data or stored value issued electronically or virtually through a mobile or other electronic device. In some examples, the merchants may include card service providers which may be a third party service or provider that represents a gift card or other card services on behalf of a select merchant. The card service providers may be third party stored value companies, a module or software component of the merchant's existing Point of Sale (POS) software and/or provider, and/or application or software purchased, created, or used by the merchant to track the virtual card services on behalf of the merchant.

In some examples, the goods and services system 16 may be configured to virtually or electronically issue card data such as loyalty data, membership data, value data (e.g. monetary data), etc., through a computing device or other electronic device. The goods and services system may include a POS system which may include software and hardware to manage electronic transactions. It will be appreciated that the goods and services system 16 may be associated with one or more merchant outlets. Example merchant outlets may include one or more commercial establishments or businesses, including brick and mortar stores, such as coffee shops, restaurants, hotels, supermarkets, bookstores, toy stores, etc. As provided herein, the goods and services system 16 may process a virtual card transaction at a brick and mortar location, in some examples. However, in other examples, the goods and services system 16 may process a virtual card transaction over the Internet or other similar network.

One type of exemplary transaction may include an electronic transaction, such as a virtual card transaction. A virtual card transaction may include communication between two systems, devices, etc., in which value and/or privilege data is exchanged and/or manipulated. For example, a virtual card transaction may include deducting value from a virtual card in exchange for a good or service at a merchant location associated with a goods and services system. Further, in other examples, a virtual card transaction may include, scanning or otherwise communicating (e.g. NFC—Near Field Communication) a virtual membership card at a merchant location associated with a goods and services system and granting access privileges to the merchant location. Further, it will be appreciated that in some examples a transaction may include implementation of security protocols.

In some embodiments, the goods and services system 16 may directly manage and control virtual card transactions. In such examples, card service provider 18 may be included in the goods and services system. However, in other examples, the goods and services system may use an external card service provider. Thus, a third party card service provider may be used in some embodiments. The card service provider may enable the goods and services system to perform virtual card transactions. As an example, the third party card service provider may be the software and hardware configured to perform virtual card transactions on behalf of a selected goods and services system. For example, the third party card service provider may include both hardware and software which, among other things, may be configured to electronically process virtual card transactions. It will be appreciated that virtual card transactions may include value transactions, such as monetary transactions in which value of a virtual card is adjusted. Additionally, the virtual card transactions may also include management of electronic privileges (e.g. card holder privileges) such as electronic access to certain types of data.

As mentioned above, card service provider 18 may be a third party stored value system or a module or software component of the goods and services system's existing POS system created or used by the goods and services system to track the virtual card services on behalf of the goods and services system. A goods and services system's POS Provider may be software, hardware, and/or other devices configured to process goods and services transactions at a location. Often times the POS may have a module or built in capability, thus making the POS System also a "Card Service Provider".

Card service provider 18 may be configured to generate at least one provider-side associative card profile 48, each associative card profile corresponding to a virtual card. The provider-side associative card profile may be stored in a provider-side database. The provider-side associative card profile may include virtual card data such as stored value (e.g. monetary value, point value), identification (ID) data {e.g. ID number, personal identification numbers (PINs)}, a card holder's name, etc. A selected provider-side associative card profile may be accessed and adjusted during a virtual card transaction. It will be appreciated that the provider-side associative card profile may be included in the goods and services system, in some embodiments.

Referring again to FIG. 1, a virtual card manager 14 may include a manager-side associative card profile 50, an integration connection engine 52 and an enablement module 56. As illustrated, virtual card manager 14 may be communicatively linked with one or more of the first computing device 12, the second computing device 13, and/or the card service provider 18 or the goods and services system 16. Additionally, the virtual card manager may include at least one manager-side associative card profile 50. The manager-side associative card profile may be stored in a manager-side database. Furthermore, it will be appreciated that in some embodiments the virtual card manager may also be communicatively linked with goods and services system 16. As such, virtual card manager 14 may be configured to manage a plurality of virtual cards.

In other words, virtual card manager 14 may be a universal virtual card manager configured to communicate with virtually any system associated with card service provider 18 and/or goods and services system 16. In this way, virtual card manager 14 is configured to manage multiple merchants which may each operate with their own systems and processors. Therefore, the virtual card manger 14 leverages a single stored value account with any third party processor. For example, a third party processor may be operable by a card service provider and/or a goods and services system. In this way, the virtual card manager 14 operates on a level above any third party processor to manage one or more versions of a shared virtual card within an infrastructure of the virtual card manager 14. As such, the virtual card manager 14 may create virtually any number of shard value cards and versions thereof across a single account. Further, as stated above, the virtual card manager 14 may manage use of the shared value cards and associated versions across any third party processor because the virtual card manager 14 operates on a higher level than a card service provider and/or a goods and services system. As such, the virtual card manager 14 is universal because it is configured to translate any processor language to periodically authenticate a virtual card and selectively enable the virtual card, as described in more detail below.

The manager-side associative card profile 50 may also include virtual card data such as stored value (e.g., monetary value, point value), identification (ID) data {e.g., ID number, personal identification numbers (PINs)}, a card holder name, etc. The provider-side associative card profile 48 and manager-side associative card profile 50 may be accessed and adjusted during a virtual card transaction.

In addition, virtual card manager 14 may be configured to manage various security features of the virtual cards such as selective enablement (e.g., access control via authentication). Example security features of a virtual card manager are disclosed in U.S. application Ser. No. 12/554,792 filed Sep. 4, 2009 entitled SYSTEMS AND METHODS FOR AUTHENTICATION OF A VIRTUAL STORED VALUE CARD, inventor David A. Nelsen. The disclosure of which are hereby incorporated by reference for all purposes.

In one example, virtual card manager 14 may be configured to manage various security features of the virtual cards such as selective enablement (e.g., access control via authentication). For example, use of a virtual card may be selectively enabled (e.g., enabled or disabled). It will be appreciated that the virtual card may have an "activated" status while the virtual card is selectively enabled. Thus, the virtual card may be "activated" but in an enabled or disabled state. Only when the card is activated and enabled is the value available for use/redemption. By using a periodic authentication and selective enablement system, use of the virtual card may be quickly turned "on" and "off" without deactivating the virtual card, thereby enhancing the security of the virtual card when compared to plastic gift cards which remain in an enabled state subsequent to activation. In other words, an activated virtual card may be first validated by the periodic authentication feature of the system, and then enabled for a period of time coinciding with a virtual card transaction. In this way, use of the stored value of the virtual card is disabled immediately before and after the virtual card transaction by the selective enablement feature of the system. It will be appreciated that periodic authentication and selective enablement may occur automatically when a user attempts to use a virtual card for a transaction, without the user needing to take additional steps in order to validate and enable the virtual card.

For example, a user may select the virtual card on a display of a mobile computing device through touch interaction. Once the virtual card has been selected, the virtual card may be automatically authenticated as a valid virtual card. For example, since the virtual card is linked to the user's computing device, the virtual card manager validates the relationship between the virtual card and the computing device, and if the relationship is recognized as valid, the enablement module may automatically toggle the virtual card from the disabled state to the enabled state. In this way, the user simply "opens" the virtual card by selecting the card on their display, and the card is automatically enabled if the relationship as described above is valid.

Since the virtual card is linked to a computing device an account number associated with the virtual card is secure. In other words, the account number alone cannot be entered for a transaction; the virtual card may be identified as linked to the computing device in order to be enabled for a transaction. Therefore, fraudulent use of the virtual card is reduced as the account number cannot be recorded and used by an unauthorized individual. It will be appreciated that the virtual card may be linked to more than one computing device such that the virtual card may be validated through periodic authentication on any one of the linked computing devices, and thus enabled for a virtual card transaction on any one of the linked computing devices.

It is to be understood that use of the phrase "periodic authentication" as used herein describes a specific period of time coinciding with a virtual card transaction, in which the virtual card is validated as an authentic card for use on a particular computing device. Therefore, "periodic" as used herein is not intended to describe randomly authenticating a virtual card. However, it will be appreciated that some embodiments may include random periodic authentication.

It will be appreciated that selective enablement may include features for a user to confirm or otherwise initiate the toggling of the virtual card to the enabled state and/or disabled state. Such features may be customizable by a user. Although described in regards to a selective enablement system, other security systems may be used to provide security to a virtual card transaction without departing from the scope of this disclosure.

Thus, in some examples, a virtual card system may be set up such that a virtual card manager is capable of enabling and disabling a virtual card. A merchant may be communicatively linked to the virtual card manager. The merchant may be able to select a level of security and/or fraud protection. Depending on the security level, a rule set may be applied for virtual cards associated with the merchant. The rule set may be applied with use of virtual cards associated with the merchant.

Figure 2:
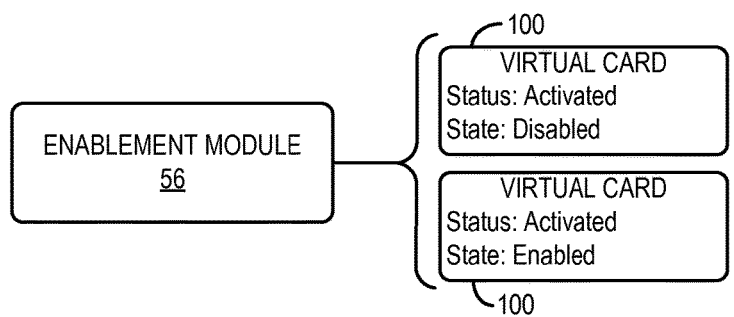
FIG. 2 shows an example enablement module that may be included in some embodiments of the virtual card management system shown in FIG. 1.

To further illustrate an example security system which uses a periodic or selective enablement system, FIG. 2 shows an exemplary use case of the enablement module (such as enablement module 56 of virtual card manager 14) according to an example embodiment of the present disclosure. It should be appreciated that other methods may be used without departing from the scope of the disclosure. As depicted, enablement module 56 may set or enable triggering of a virtual card 100 between an enabled or disabled state. However, the virtual card may have an "activated" status. Thus, use of the virtual card may be quickly turned "on" and "off" without modifying the status of the virtual card (e.g., deactivating). The activated status of the card may indicate that the card is available for use, such that there is stored value on the card that is available for use. In some examples, where the virtual card is a virtual membership card, an activated card may be a card that is issued and the value in terms of privilege value is available.

It should be appreciated that enablement and disablement may be effectuated in many ways without departing from the scope of the disclosure. Such examples of enablement and disablement are provided for exemplary purposes and are not intended as limitations. Thus, in some examples, the enablement module may not affect the stored value on the card, but instead manages the usability of the card. That said, it should be noted that in some systems, a method of disablement may include temporarily removing the privilege or stored value on the card at the Card Service Provider, by storing that privilege with the virtual card manager until just prior to use. In some examples, a card may be disabled by removing the value on the card and holding that value in the Manager-side associative card profile. The value may be added back to the Provider-side associative card profile at the last moment prior to use. In such systems, the card may be enabled and disabled with the card service provider without inactivating the card.

It should be appreciated that periodic authentication and selective enablement security systems may protect versions of shared virtual cards. For example, use of each version of a shared virtual card can be confirmed through periodic authentication, as described above. Thus, not only is the stored value account secured, but versions of the stored value account are secured. Further, through periodic authentication and cross-checking as described in FIGS. 8-10, it may be possible to determine which version of a shared virtual card is being used.

To further provide an illustration of an example method, in one example in regards to FIG. 1, a virtual card may be delivered to a user through a computing device, such as a stationary computing device or a mobile computing device.

The virtual card may be delivered for use to a user's computing device (e.g. first computing device 12). Predetermined authentication rules, also referred to as security rules, may be associated with the virtual card. The authentication rules may be implemented such that the state of the virtual card (e.g. enabled state, disabled state, etc.) may be managed by the virtual card manager. In some systems, the virtual card manager may be a remote server while in other systems the virtual card manager may be on the computing device.

As an example, depending on the authentication rules, use of the virtual card may be limited to an identified computing device such that an attempt to use the virtual card from an unidentified (unassociated) computing device is blocked. When such a use is requested, the virtual card may remain in a disabled state, thereby preventing the unauthorized use of the card. Again, depending on the rule set, in some systems, a merchant may be able to over-ride the disabled state if additional identification is provided. Although the above example is described in regards to identification of a single computing device, in some examples, a user may be able to introduce additional computing devices as authorized computing devices. In such systems, the rule set may enable identification of a requesting computing device as an authorized computing device such that the state of the card is enabled.

Although only a single card service provider and computing device are depicted, it will be appreciated that virtual card manager 14 may act as a common platform for managing a large number of virtual cards corresponding to a plurality of card service providers. In some examples, two or more of the card service providers may have different characteristics. For example, two or more of the card service providers may utilize different communication protocols and may be linked to different goods and services systems and therefore provide different services. Furthermore, the card service provider may provide different types of card services. For example, one card service provider may provide membership card services while another card service provider may provide gift card services. In this way, a single virtual card management system can be used to manage a large number of virtual cards, facilitating scalability of the virtual card management system, thereby enhancing the market appeal of the virtual card management system.

Again returning to FIG. 1, in addition to the manager-side associate card profile and the enablement module, in some examples, the virtual card manager may include an integration connection engine 52 configured to communicatively link the virtual card manager with at least one card service provider 18 (and/or a goods and services system) via an API or other software communication standard included in the card service provider. In this way, the virtual card manager may communicate with the card service provider. When a plurality of card service providers are communicatively linked to the virtual card manager at least a portion of the card service providers may utilize different communication protocols, communication hardware, security protocols, etc. Thus, the integration connection engine may enable the virtual card manager to interact with a number of different card service providers. In other embodiments, the card service provider may wish to use an API or other software provided by the virtual card manager to enable communication. In further examples, the card service provider may include other methods or systems for communicating with the virtual card manager. Additionally, it will be appreciated that in some systems, the integration connection engine may include one or more virtual card adapters configured to modify the data sent/or received into a common programming language, such as XML.

Virtual card manager 14 also may, amongst other functions, provide for management of a shared virtual card. For example, virtual card manager 14 may include a shared card manager 54. It should be appreciated that shared card manager 54 may be integrated such that it accesses one or more of the manger-side associative card profile 50, the integration connection engine 52, and/or enablement module 56. Further, it should be appreciated that the shared card manager may be part of at least one of these components, such as part of the virtual card manager and/or reside in whole or in part on one or more of the first or second computing device, the card service provider, or the goods and services system.

Shared card manager may be adapted to manage one or more versions of a shared card. In some examples, a user may be able to select to share or split a virtual card into two or more versions of the card. As described above, the versions of the card may provide identical privileges and/or may provide limited privileges depending on the version of the card. In some embodiments, a user may be able to select to share a virtual card and may be able to control the privileges associated with the shared card. In other embodiments, limited controls may be provided to the user such that a first version of a shared card is identical to a second version for a shared card.

Figure 3:
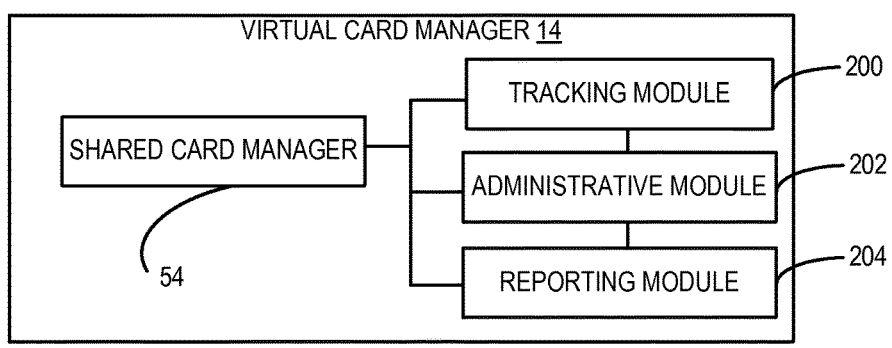
FIG. 3 shows an example virtual card manager that may be included in some embodiments of the virtual card management system shown in FIG. 1.

FIG. 3 further illustrates virtual card manager 14 including a shared card manager 54. As described above, shared card manager 54 may be communicatively and operatively linked with the integration connection engine, the enablement module and/or the manger-side associative card profile in some embodiments. Further, the shared card manager may be communicatively and operatively linked to one or more modules which may reside on or be linked to one or more of the components of virtual card manger 14. For example, the shared card manager may be linked to modules, such as tracking module 200, administrative module 202, reporting module 204, etc.

As an example, tracking module 200 may be configured to track and record information corresponding to the sharing and creation of versions of one or more virtual cards. The information may include the number of virtual cards that have been shared and the number of versions created for each card, the use of the versions and status of the versions, the matching data of the version to the original virtual value card, the associated virtual value account, etc.

In addition to tracking the shared value cards, statistical information may be tracked including data such as the percentage of virtual cards that have been shared, the frequency of sharing, the gender of the user's who initiate sharing, and other information regarding use of the sharing function for a specific goods and services system. In some examples, the merchant may access a tracking report documenting the aforementioned information via a computing device. In this way, a merchant may access statistical information about the virtual cards and use of the virtual cards.

The virtual card manager may further include an administrative module 202 configured to manage the functionalities assigned to each version of a shared virtual card administered by the virtual card manager. For example, the administrative module may enable a first version of the shared virtual card to enable further sharing, while a second version may be prohibited from downstream sharing. Additionally, the administration module may be configured to manager various fraud and security elements for each card or version administered by the virtual card manager.

The virtual card manager may further include a reporting module 204 configured to report the tracking data and/or administrative data in response to a request to view such data. For example, the reporting module may be configured to provide data reports to a goods and services system so that a merchant may gather statistics associated with users of the merchant's shared virtual cards. However, it will be appreciated that data reports may be provided to virtually any system in communication with the virtual card manager. In another example, the reporting module may be configured to provide tracking data reports to the administrative module to determine if data associated with the shared virtual card versions meet the fraud and security elements as described above. For example, the reporting module may communicate with the administrative module in real-time to provide instantaneous updates in terms of use or activity of the virtual card in order to determine if potentially fraudulent activity is occurring. As another example, reporting module 204 may be configured to receive reports from a reporting module of the virtual card engine 30 of a personal computing device, as described in more detail below.

Figure 4:
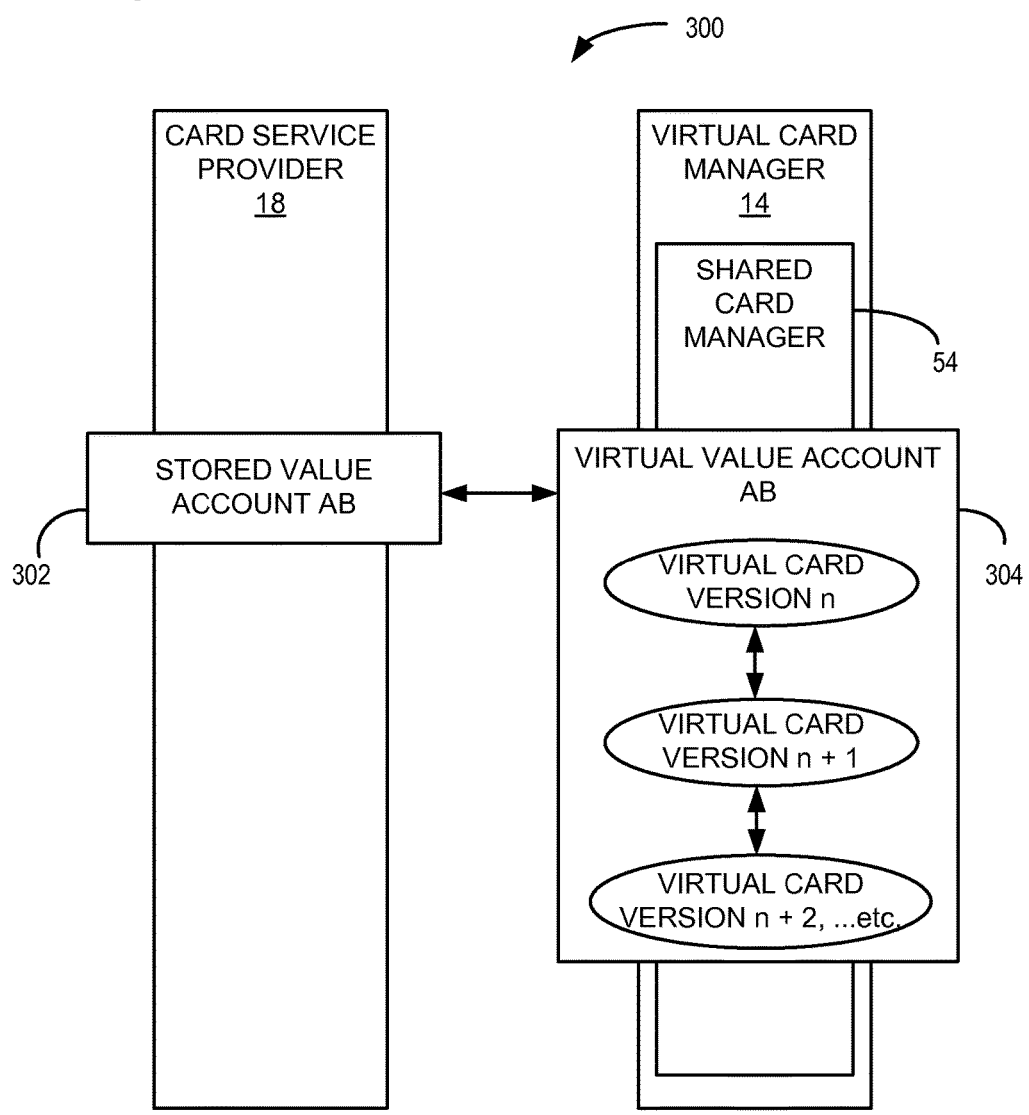
FIG. 4 illustrates an example method for managing a shared virtual card according to an embodiment of the present disclosure.

Turning now to FIG. 4, an example method 300 for managing a shared virtual card according to an embodiment of the present disclosure is provided. As shown, the method may be implemented via virtual card manager 14 and card service provider 18. It should be appreciated that the method may be implemented in whole or in part by other system components, including the virtual card engine of the first and second computing device, the goods and service system, etc. Further, in other embodiments, method 300 may be implemented by other suitable systems, modules, components, etc.

As shown, card service provider 18 may provide a stored value account AB which corresponds to a value card AB, at 302. The virtual card manager 14 may include a shared card manager 54 which may provide for versioning of the virtual value account, at 304. The virtual value account AB is illustrated as including Virtual Card Version n, Virtual Card Version n+1, Virtual Card Version n+2 . . . , etc.

As described herein, sharing and creating virtual versions of single stored value accounts may be managed by the virtual card manager while still following the typical models of the card service provider and/or goods and services systems. In the disclosed example, the virtual card manager creates a new layer for the stored value that rides above the card service provider, while still allowing sharing of stored value from the account. The versions may be considered sub-accounts. As an illustration, use of the virtual card manager and the shared card manager enables tracking of multiple versions, where the virtual card manger can track the owner of each version even though the card service provider (and/or the goods and services system) is not aware there our two, three or any other number of owners holding multiple versions representing a single stored value account. The virtual card manager provides security and accessibility models to the versions independent of the card service provider on the layer which rides above that of the card processor.

Below are further illustrations of uses of versions of a shared virtual card correlating to a single stored value account. In one example, multiple parties may desire to share a virtual card account. For example, a stored value card is given as a wedding gift, and both individuals may wish to retain possession of the card and be able to use the card. In such a situation, each party may receive a version of the card for their use but tied to the same account. Thus, the marital couple may both be in possession of a version of the virtual card and may carry the card with them in their mobile device or in paper form for use at the merchant. The couple would not be required to exchange the card between themselves prior to each using the stored value that is represented by that card.

As another example, a version of a shared virtual card may be given to a child or multiple children by a parent and all parties need possession for use. Each child may be provided a version which may be controlled by the parent. In another example, versions of a shared virtual card may be provided to an employee (or group of employees) by an employer.

For the parent or employer, the shared virtual card gives a first party the ability to hand over a stored value card (possibly even with limited functionality) to a select receiver or group of receivers. In some examples, and as described in more detail below, depending on the allowed capabilities of the version, each version of the card may be used separately. Monitoring systems may be engaged to ensure proper use. For example, parent or employers may continue to have access to the card by either retaining a version of the card, retaining the original card or receiving a new version of the card. Furthermore, the parent that has multiple children can give all of them the same card while understanding which child is doing which transactions, and the parent only has to periodically add stored value to a single stored value account. Systems may be provided to enable a parent or employer to limit access to card use and set privileges for the various card versions.

Moreover, as another use example, a user may select to use a shared virtual card as the selected method of paying for goods and services by a family of two or more and use of versions of the shared virtual card may help maintain a budget of spending with the merchant, or in the case of an Open Loop card, budgeting across multiple merchants. For the married couple or partners that like to have a budget, being able to share a single stored value account via multiple versions can keep the couple on budget, but also allow them to track and monitor why and when the account is being accessed.

It should be appreciated that the above examples are provided for illustration purposes only and that other use examples are considered and are within the scope of the disclosure.

The virtual value account and the number of versions in the virtual value account may be determined by a user. For example, in FIG. 5, an example depiction of an example virtual card engine 30 from a user computing device is provided at 400. As previously discussed, the virtual card engine may be stored on memory executable via at least one processor. Moreover, the virtual card engine may be executed on a computing device or a remote Internet server. In this way, a browser-based or client-based virtual card engine may be utilized.

The virtual card engine may include a virtual card toolbox 410 having various modules that enable virtual value card management functions. The user and/or merchant may choose the module provided in the toolbox for each virtual card or virtual card type. In this way, the toolbox functionalities may be customized for one or more virtual cards or virtual card types.

Although different modules may be coupled to the virtual card toolbox, example modules include a sharing module 412, a value modification module 414, a graphical modification module 416, a reporting module 418, a media attachment module 420, a password module 422, and a shared setting module 424. Further, although not illustrated, the modules may include a geo-comparative module with geographic identification data, a presentation module, etc. These modules are provided as example modules and are not intended to limit the scope of the disclosure in any way.

Each module may enable a user (or a merchant when used from the merchant end) to customize and manage a virtual card received by the user. Management of the virtual card may include options to share a virtual card. In other examples, options may be provided to enable transfer or reassignment of a virtual card similar to the sharing management. For example, sharing module 412 may be configured to enable sharing of a virtual card from the virtual card engine 30 to a selected second device creating a second version of the virtual card. Sharing of a virtual card may include authorizing the use of the second version of the virtual card while retaining some or all of the functionality of the first version (original) virtual card for use by the user. Use of a virtual card may include implementation of a virtual card transaction (e.g., exchanging goods and services for value data stored on a virtual card). It will be appreciated that various security features may be implemented during sharing to reduce the likelihood of fraudulent card use.

In addition to sharing module 412, in some examples, the virtual card toolbox may include a value modification module 414 configured to modify value data (e.g., increase or decrease) corresponding to a virtual card based on user input. The versions of the virtual card may be able, in some embodiments, to be treated as the original virtual card, such that the functionalities of the original virtual value card, may apply to the versions of the virtual value card. The value modification module may be further configured to send a request to an associated card service provider to modify value data in a corresponding provider-side associative card profile and/or the virtual card manager and the manager-side associative card profile. In some examples, value may be added to the virtual card from another virtual card and/or plastic card having value.

Further, in some embodiments, the value modification module may be adapted to enable minimum and maximum values that can be added to a virtual card. For example, 50 cents may be the minimum threshold value that may be added to a virtual card, due to the price of associated transaction charges. Increasing the value of a virtual card to a maximum value may be referred to as "topping off" the virtual card. Further in some embodiments, incentives may be provided by the card service provider or the merchant to increase the value of a virtual card. For example, a promotional card, virtual coupon, etc., may be offered to a user when the value of a virtual card is increased to meet or exceed a threshold value determined by the merchant or card service provider.

Further in some examples, value modification module 414 may be configured to combine value data for two or more virtual cards. In this way, a user may consolidate a number of virtual cards included in the virtual card engine. Value modification module 414 may also be configured to generate a second virtual value card and transfer a portion of the value data onto the second virtual card. In this way, a virtual card may be split. Example methods used to split the value of a virtual card and combine value cards are disclosed in U.S. application Ser. No. 12562091 filed Sep. 17, 2009 entitled SYSTEMS AND METHODS FOR MANAGING AND USING A VIRTUAL CARD, inventor David A. Nelson. The disclosures of which are hereby incorporated by reference for all purposes.

The virtual card toolbox may further include additional modification modules, such as example graphical modification module 416. Graphical modification module 416 may enable user customization of a virtual card. Although, the graphical modification module 416 may be available to versions of a shared virtual card, in some examples the module may be turned off or features limited.

As an example, the graphical modification module 416 may be adapted to enable a user to modify the appearance of a portion or associated image of at least one virtual card presented on a display of a computing device. The appearance of the virtual card may include at least one of size, color, geometric configuration, and graphical characteristics (e.g. alpha-numeric data, images, logos, etc.). In some examples, modifying the appearance of a virtual card may include modifying an alphanumeric greeting presented directly on the virtual card or presented in a separate window when a virtual card is accessed. In this way, a user may customize and personalize the virtual card for a target recipient, thereby increasing customer satisfaction.

The virtual card toolbox may further include one or more reporting modules or status modules, such as reporting module 418. Reporting module 418 may enable a user to report a status of a virtual card, such as a "lost/stolen" status. The lost/stolen status may be a result of error in reassigning the virtual card (such as to the wrong recipient). In other examples, lost/stolen status may be a result of losing a printed virtual card or deleting the virtual card or version of a virtual card.

In some examples, a "lost/stolen" call may be sent to a virtual card manager and forwarded to a card service provider in response to user input indicating that a virtual card may be lost or stolen. For example, reporting module 418 may send a status reporting indicating that the virtual card is "lost/stolen" to the reporting module 204 of the virtual card manager, as described above. However, in other examples, the lost/stolen call may be sent directly to the card service provider. In response to the "lost/stolen" call, the card service provider may reissue a new virtual card to the virtual card engine. In some examples, re-issuing a new card may include generating a new manager-side and provider-side virtual card profile as well as generating a new virtual card and sending the new virtual card to the virtual card engine. In other examples, re-issuing a new virtual card may include redeeming the virtual card's stored value and transferring the stored value to a new provider-side associative card profile having a new identification number and/or PIN. It will be appreciated that different card service providers may have different responses to a "lost/stolen" call based on the capabilities of the card service provider. Further, in some embodiments, a report including information pertaining to the movement of monetary value in the card service provider may be sent to the merchant in response to the "lost/stolen" call. Further still, in some embodiments, the virtual card manager may disable and/or deactivate the virtual card when a "lost/stolen" call is received. In this way, a user may inhibit unauthorized use of a virtual card if they suspect that unauthorized use may occur. For example, a printed copy of a virtual card may be misplaced or possibly stolen. Therefore, a user may choose to report a virtual card "lost/stolen". In some examples, the user may be charged for each use of the reporting module, discouraging unnecessary use. It will be appreciated that the reporting module may provide additional security against fraudulent use of a virtual card.

The virtual card toolbox may further include a media attachment module 420 configured to attach audio and/or video clips or game clips to a virtual card or one or more versions of the virtual card. In some examples, the audio or video clips may be presented directly on a displayed image of the virtual card. However in other examples, the audio and/or video clips may be presented in a separate window when a virtual card is accessed. The user may selectively attach such audio or video clips to customize the virtual card to a target recipient. In some embodiments, the target recipient may be able to replay such audio and/or video clips. In some examples, the media attachment modules may be limited or unavailable for some versions of a virtual card depending on a user's selection, the manager's selection, etc.

The virtual card toolbox may also include enhanced security modules, such as a password module 422. Password module may be configured to require a user to enter a password to gain access to the virtual card engine. It will be appreciated that in some embodiments, a user may selectively activate the password module. Alternatively, the password may be determined by the user of the virtual card engine. The password adds another level of security to prevent unauthorized use of a virtual card. The consumer controlled password may enable a user comfort that transfer or re-gifting can only occur through their initiation. In some examples, the password may be independent of a virtual card's PIN or other code. By providing this additional user password, additional security may be obtained such as in an open loop card system where the card can be used at a plurality of locations and may be more difficult to monitor. It should be appreciated that in some systems, each version of a shared virtual card may have a different password or be selectively set for the specific version. In other examples, a password or pin may be shared between the versions for a single virtual card account.

It will be appreciated that the functionalities of the modules included in the virtual card toolbox may be implemented together in a single step. As such, various functionalities may be packaged with the sharing process. For example, the functionalities described with regard to the value modification module, the graphical modification module, the reporting module, and the media attachment module may be carried out directly prior to or during sharing of a virtual card. In this way, various aspects of the virtual card may be customized by a user when a virtual card is shared, thus enabling a user to personalize a version of a virtual card for the intended recipient. After sharing is initiated the user may be prompted by the virtual card engine to alter various aspects of the virtual card such as the password, the card's appearance, audio, and/or video attached to the card, etc.

Returning again to the illustrated modules in FIG. 5, the virtual card engine may further include a sharing settings module 424 including a plurality of virtual card sharing settings 426. The sharing settings may allow a user (or a merchant) to selectively enable or disable the virtual card functions (e.g., toolbox functions) that may be available to a virtual card engine to adjust various aspects of the virtual card version. In this way, the toolbox functions may be controlled depending on the version of the card. For example, a user may choose to inhibit reassignment of a shared virtual card. In another example, a user may choose to allow the appearance of a shared virtual card from being altered.

Figure 6:
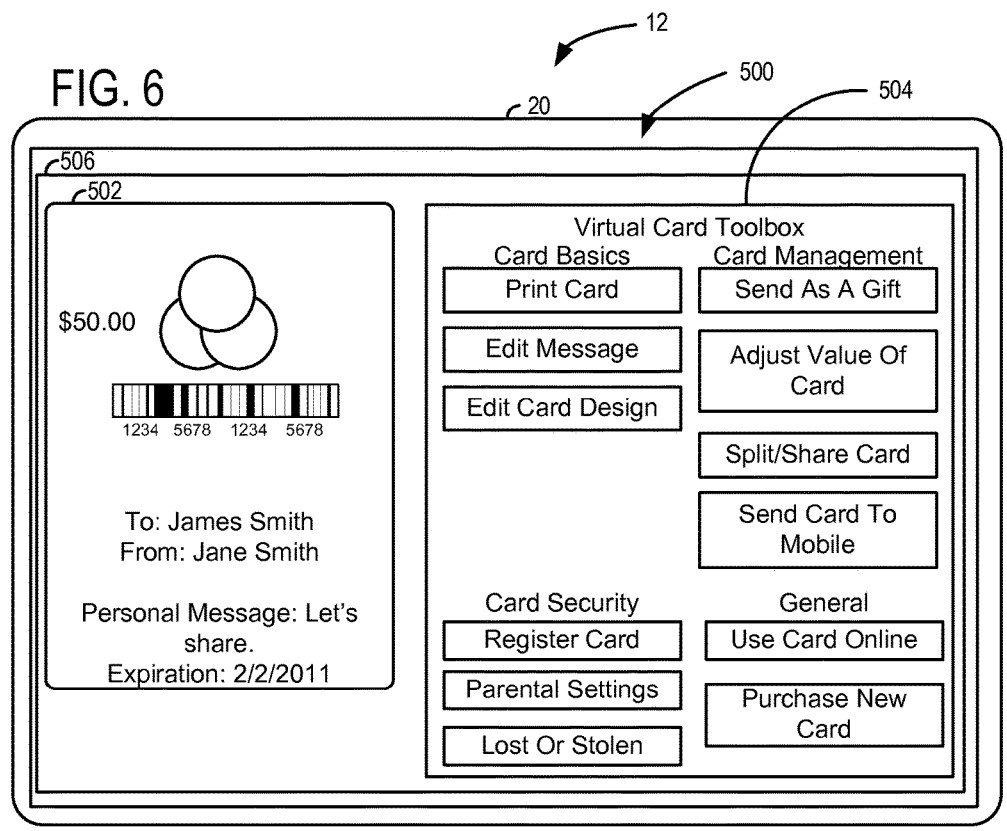
FIG. 6 shows an example of a content window of a computing device enabling sharing of a virtual card according to an embodiment of the present disclosure.

FIG. 6 shows an example, at 500, of a content window of a computing device enabling sharing of a virtual card according to an embodiment of the present disclosure. The content window may be provided by a virtual card engine to enable functionality and view of a virtual card or version of a virtual card. As previously discussed the virtual card engine may be executed on a computing device or executed via a remote Internet server. It will be appreciated that the content windows are exemplary in nature and alternate content windows may be provided to enable the functionality of the virtual card engine in other embodiments. Further it is noted that the virtual card toolbox may be different depending on the version of the shared virtual card being held. For example, an original virtual card holder (e.g. a parent holder) may have a full function virtual card toolbox, while a recipient version shared virtual card holder may have a limited display for the virtual card toolbox with one or more features removed, locked or unavailable.

As an example, FIG. 6 shows first computing device 12 including display 20 on which an exemplary virtual card 502 and virtual card toolbox 504 is displayed. It should be appreciated that one or more versions of virtual card 502 may look identical to or substantially identical to virtual card 502. The virtual card and the virtual card toolbox utility panel may be presented in one or more content windows 506.

In this example, the user of first computing device 12 has a virtual card of $50.00 retained in their virtual card engine 30. The virtual card toolbox display provides user selection inputs to enable user-management, user-customization and sharing. As shown, the virtual card toolbox includes various buttons or other suitable graphical elements that enable implementation of toolbox functions. It will be appreciated that some toolbox buttons may directly trigger a toolbox function while other buttons may trigger the presentation of a content window configured to enable a user to implement a toolbox function. Further, it is noted that certain types of cards may or may not use the toolbox. For example, a promotional virtual stored value card may limit toolbox functions, such that the user may not be able to change card design or re-gift.

As described above, from a virtual stored value card, in some systems, versions of a single stored value card may be changed such that the version responds differently depending on the specific version (who is using the virtual stored value card). Such specific permissions and features may be available for both versions of mobile virtual cards, but can also be controlled from a browser-based version used from a computer. As an example, and as described in more detail below, parental settings may allow the parent to turn on or off certain toolbox features, and will disallow the child (or other recipient) a version of the card with limitations and reporting functions. The child version may be locked preventing the child from having the capability to change parental settings and/or notification options.

FIG. 6 shows several example toolbox features that may or may not be present in a shared version of a virtual card or a re-gifted version of a virtual card. For example, the shared version of a virtual card may not have access to see the personal greeting, may not have the ability to edit card design, may not have the ability to resend as a gift, or set parental settings. The parent version of a virtual card may have the option to selectively turn features on or off.

The button labeled "Print Card" may be configured to print an image of the virtual card in response to a user selection. A user may select to print the virtual card for redemption. Selection of the buttons labeled "Edit Message" and "Edit Card Design" may trigger presentation of at least one appearance adjustment window on the computing device. The user may edit the message and/or card design from the received gift card which may have been previously stylized by the merchant or selected by the original provider of the card. As such, the appearance adjustment window may be configured to enable adjustment and customization of the appearance of the virtual card. For example, a user may have received a virtual card during Christmas and the virtual card has related Christmas presentation effects and messages. The user may edit the virtual card to match a new theme—such as Father's Day or the Fourth of July—changing the message and theme for presentation and viewing of the virtual card. The graphical modification module 416 shown in FIG. 5 may provide the programmatic functionality to the appearance adjustment window.

Selection of the button labeled "Send As Gift" may trigger the presentation of a reassignment window. The reassignment window may be configured to enable implementation of reassignment of a virtual card from a virtual card engine to a target virtual card engine. A reassignment module (not shown) may provide the programmatic functionality to the reassignment window.

Selection of the button labeled "Adjust Value Of Card" may trigger the presentation of a value adjustment window on the computing device. The value adjustment window may enable a user to adjust or add value to the virtual card. Value modification module 414, shown in FIG. 5, may provide the programmatic functionality to the value adjustment window.

Selection of the button labeled "Split/Share Card" may trigger the presentation of a card splitting window or card sharing window. The card splitting window may enable a user to prepare versions of the card for delivery to a second device. In some examples, the full value of the card may be shared. In other examples, a user may divide the value of the virtual card between multiple versions. It should be appreciated that there may be multiple communication methods for sharing the virtual card, including, but not limited to email, text message or other communication method. In some embodiments, a user may be able to select the communication mechanism for sharing a version of a virtual card. Sharing module 412, shown in FIG. 5, may provide the programmatic functionality to the card splitting window.

Selection of the button labeled "Send Card To Mobile" may send a version of the virtual value card to a user selected mobile computing device. Selection of the button labeled "Register Card" may register an intended recipient of the virtual card with the merchant before sharing is initiated, in case the virtual card is lost during sharing. Also, in some examples, a recipient of a version of a shared card may be prompted to register the shared version. The button labeled "lost or stolen" may enable a user to report the virtual card or version of the virtual card as lost or stolen to the virtual card manager.

The button labeled "parental setting" may enable a user to set various parental controls for the virtual card or for the version of the virtual card. The parental settings may include a "reporting" selection which would provide reports to the original virtual card holder on activities of the recipient of the version. For example, reporting services may include features to monitor use of the child version, how and where the version is being used, reports on transaction amounts and location-based data. Such reporting services may provide such reports only to the requested original virtual card holder, preventing the recipient or child version access to such reports.

Further, in some systems, a settings button may correspond to adjusting other settings. For example, settings that may be included on the virtual card or version of the virtual card are: a selection to allow the card to be shared; a selection to allow a user to turn off the ability to allow a version to have an edited message; a selection to allow a user to turn off the ability to edit the card design; a selection to turn on or off other customization functionality.

The button labeled "use card online" may enable a user to make purchases with the virtual card or the version of the virtual card online. In some examples, an online merchant outlet may be configured to provide one click purchasing when the virtual card is used as a form of payment online. The button labeled "Purchase New Card" may enable a user to purchase a new card.

As previously discussed, the merchant (or card service provider or virtual card manager) may select the toolbox functionalities available for each virtual card or version of virtual card. Therefore it will be appreciated that in other embodiments the set of functions provided in the virtual card toolbox may be altered.

Figure 7:
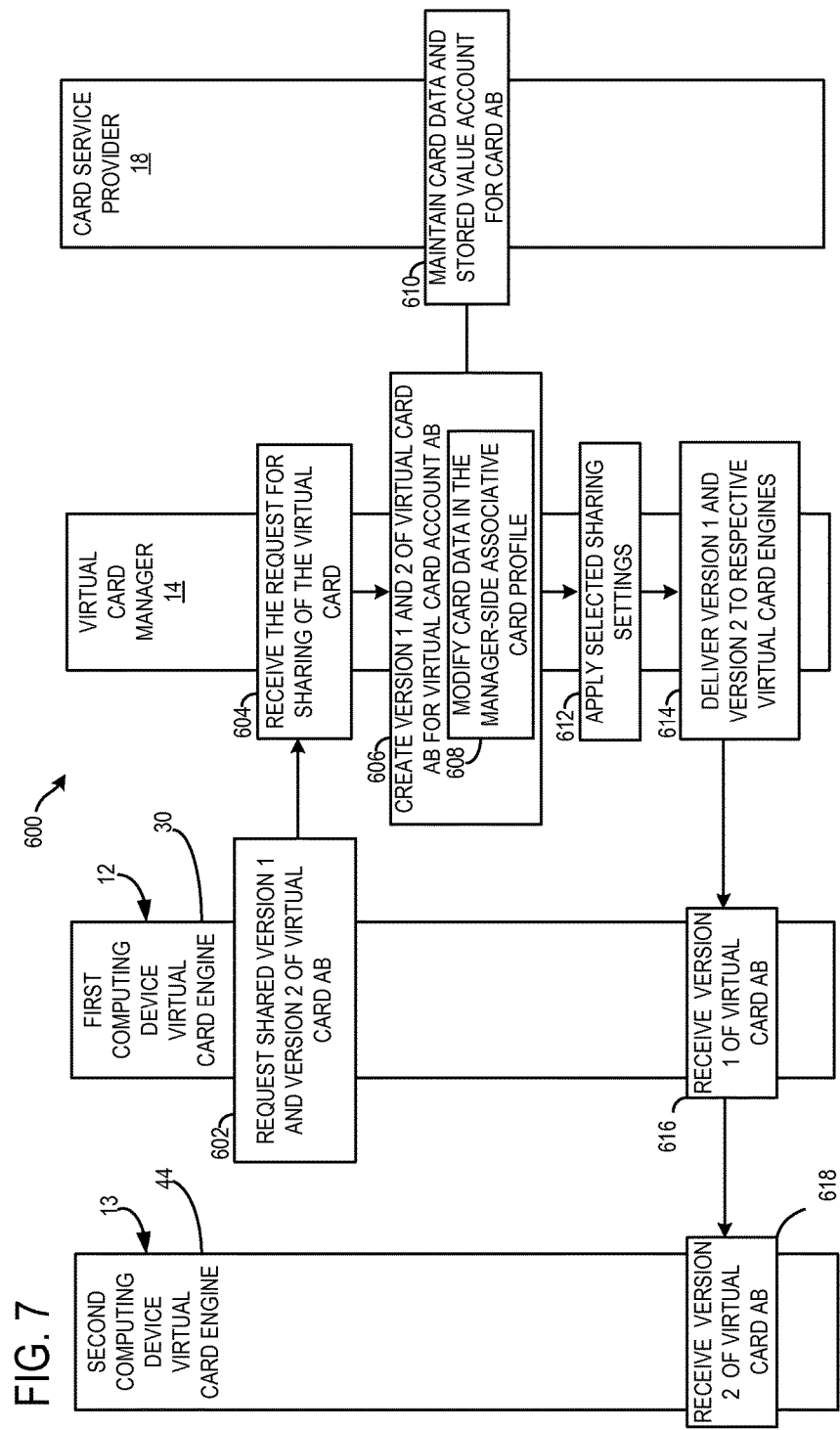
FIG. 7 illustrates an example method of sharing a virtual card according to an embodiment of the present disclosure.

Turning now to FIG. 7, an example method 600 of sharing a virtual card is illustrated according to an embodiment of the present disclosure. As shown, the method may be implemented via virtual card engine 30 of first computing device 12, the virtual card engine 44 of second computing device 13, virtual card manager 14, and card service provider 18. However, in other embodiments method 600 may be implemented by other suitable systems, modules, components, etc.

At 602, the method includes requesting sharing of a virtual card. As illustrated, the request is for sharing of version 1 and 2 of virtual card AB. It will be appreciated that user input may trigger the sharing request. In some examples, various aspects of the virtual card may be altered before or during a sharing request, such as altering the appearance of the version of the virtual card, adjusting the value of a select version of the virtual card, attaching media (e.g., audio and/or video files), and/or altering the greeting provided with a version of the virtual card. Further, although shown as sharing two versions, it should be appreciated that any number of versions could be shared depending on the limitations set by the card manager and/or card service provider or merchant.

Next at 604 the method includes receiving the request for sharing of the virtual card via the virtual card manager. In some examples, the virtual card manager may selectively authorize the sharing of the virtual card depending on the authorization or capabilities of the goods and services system and/or the card service provider. In this way, sharing of certain virtual cards may be permitted while sharing of other virtual cards may be inhibited. Limitations of the number of versions, the differences in the versions, etc. may also be controlled by the virtual card manager.

Next, at 606, the method includes creating versions of the virtual card. As illustrated, a select virtual card AB may be shared into version 1 and version 2. Both versions are linked to the virtual card account AB within the virtual card manager 14. The virtual card account corresponds to the stored value account maintained by card service provider 18 as indicated at 610.

In some examples, creating versions of the shared virtual card may be fully managed by the virtual card manager. As such the manager-side associative card profile 608 may be modified to track the versions created. However, in some systems, the provider side associative profile may not be altered such that the provider side associative profile only track that existence of the original stored value account and is blind to the existence of the multiple versions. In other examples, the provider side associative profile account data may also be updated to reflect the creation of versions.

As another example, in some embodiments, a new manager-side associative card profile may be generated which may provide a new link to the old provider side associative card profile may be generated. Value data from the old card profile may be transferred to the new profiles and the old manager-side profile may be subsequently deleted or reclassified.

Next, at 612, the method includes applying selected sharing settings. The sharing settings may be based on user-selected features or may be based on a prior rule set. Such settings may include time period for use of a version, limitations on types of use of the version, notification settings regarding use of a version, etc.

In some systems, at 614, the example method includes delivery of version 1 and version 2 to respective virtual card engines. The delivery may be automatically managed by the virtual card manager once authentication of the version has been completed. As discussed in more detail below, even though there are different versions, and the same card identification number may be used for the initial card, the virtual card manager can differentiate between the various versions which are delivered. In some systems, features may further be provided to enable a user to customize one or more of the versions to have a different PIN or identification number.

At 616, the method includes receiving version 1 of virtual card AB at first computing device virtual card engine 30. Likewise at 618, virtual card engine 44 may receive version 2 of virtual card AB. It is noted in some examples, version 1, which is the original version (original virtual card) may be retained during the method by virtual card engine 30 such that step 616 is not necessary and delivery occurs only for versions sent to new computing devices, such as second computing device 13.

In receiving the created version of the virtual card, a notification may also be received. For example, a notification, such as an email or other message, of receipt of a version of a virtual card may be delivered electronically. For example, the notification may enable access to a link or may open a link included in the notification directing the user to a remotely executed virtual card engine configured to manage the version of the virtual card.

Once received, the version of the virtual card may be available to enable for use. In some examples, use of the version of the virtual card may be disabled until the version of the virtual card is transferred to the target virtual card engine. In some examples, the version of the virtual card may be enabled in response to authentication of the target virtual card engine. Authentication of the target virtual card engine may include opening a link provided with the virtual card and personally identifying the computing device and the version of the virtual card with requested information determined by the virtual card engine.

It will be appreciated that in some embodiments, a computing device may receive more than one version of a shared value card. For example, a computing device may receive both version 1 and version 2 for use. In another example, a first computing device may store a parent version (e.g., an original shared value card) and send a version of the parent version to a second computing device. In another example, the virtual card engine of the computing device may create one or more versions of a parent virtual card in order to share stored value between the one or more versions. In this example, the virtual card manager may deliver one or more versions of the shared virtual card to another computing device. Further, the virtual card engine may retain the parent version and one or more shared versions for use. It will be appreciated that virtually any configuration regarding creating, delivering, and storing shared virtual card versions is possible without departing from the scope of this disclosure.

Figure 8:
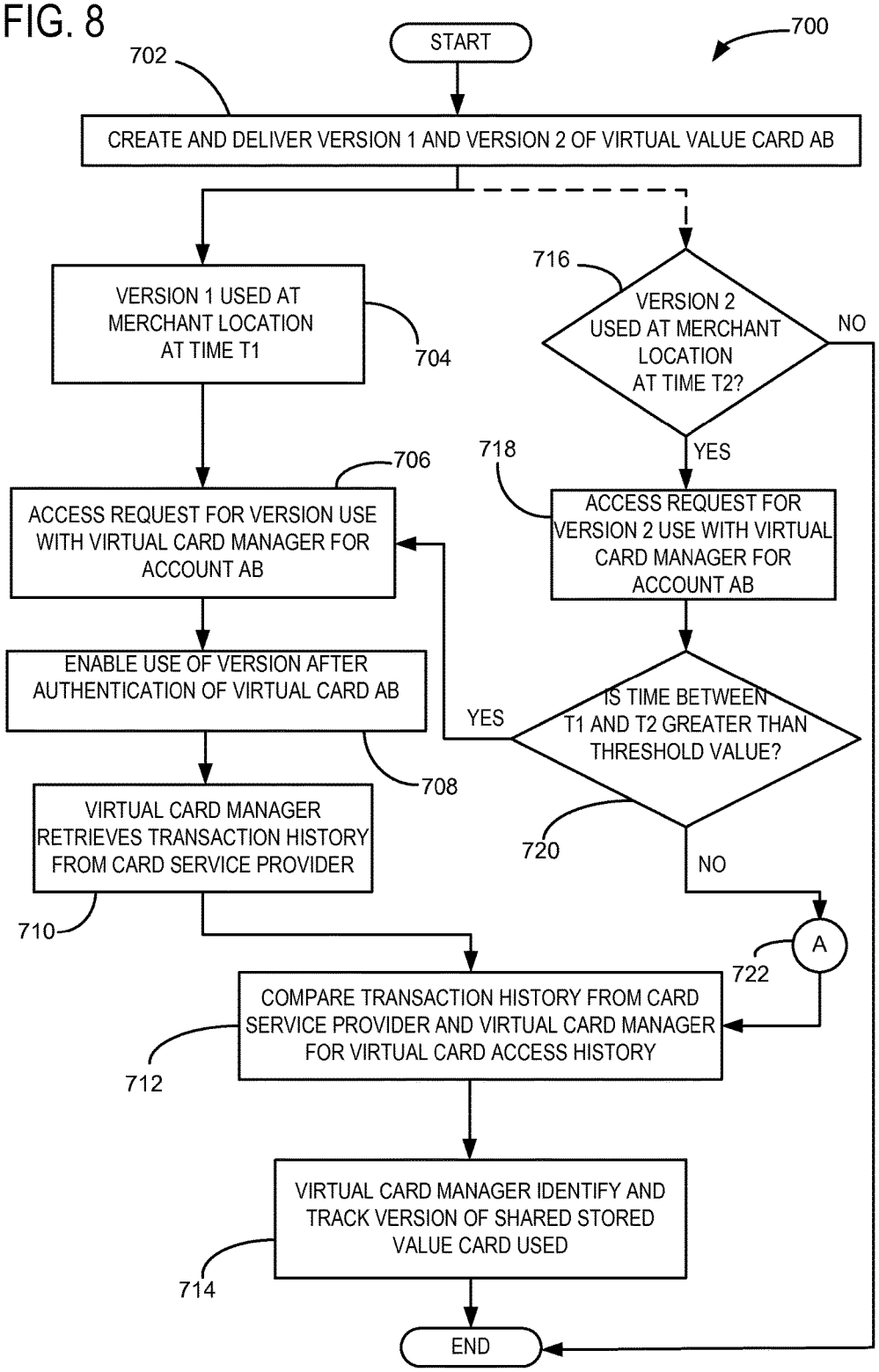
FIG. 8 illustrates an example method of monitoring use of a version of a shared stored value card according to an embodiment of the present disclosure.

FIG. 8 illustrates an example method 700 of monitoring use of a version of a shared stored value card according to an embodiment of the present disclosure. As shown at 702, versions, such as version 1 and version 2 of virtual value card AB, may be created and delivered. For example, the versions may be created and delivered in accordance with the method shown in FIG. 7 or any other suitable method. Once multiple versions of a card exist, the virtual card manager tracks and determines through tracking methods described below which version of the virtual stored value card accessed the corresponding stored value account with the card service provider. Specifically, in one example, the tracking methods include comparing the records of store transactions at the card service provider (and/or the goods and services system) to the records of requested access to use the virtual card account by the virtual card manager and then analyzing which version of the virtual card was used. The two systems (the virtual card manager system and the card service provider system) are cross-analyzed to determine who used the account in a shared account set-up.

In some embodiments, the virtual card manager may be blind to use of a virtual card at the merchant without requesting the data from the card service provider used by the merchant. However, the card service provider is blind and cannot identify the version of a shared virtual card that was used when a stored value transaction was recorded as the card service provider, as the card service provider maintains only a single stored value account. In the current system, in some embodiments, the virtual card manager can compare the time of transaction at the card service provider (and/or the goods and services system) with the time of virtual card access to a specific version and determine based upon allowable time limitations which version of a shared virtual value card was used to complete a transaction.

For example, at 704, version 1 is used at a merchant location at time T1. At 706, receiving an access request for use of version 1, wherein the virtual card manager receives the access request for stored value account AB. Use is enabled of the version after authentication of virtual card AB according to the stored value account AB associated with the virtual card AB, at 708.

The virtual card manager may retrieve transaction history from the card service provider at 710 accessing information regarding use of the stored value account. The transaction history from the card service provider and virtual card manager may be compared for virtual card access history, at 712. Specifically, a comparison is made between a transaction time logged in the transaction history of the card service provider to the time of virtual card access request to version 1 in order to determine which version of the shared virtual value card was used. As such, the virtual card manager may identify and track the use of the version of the shared stored value card, at 714.

It is noted that a second version of the virtual value card may be used in a similar manner as with version 1. At 716, the method continues by determining whether version 2 is being used at the merchant location at time T2. If version 2 is not being used the method ends. If version 2 is used at the merchant location, the method continues to 718. At 718, an access request for use of version 2 is made with the virtual card manager for account AB. In enabling use, the time between requests between the versions is reviewed. For example, at 720, it is queried whether the time between use of version 1 at Time T1 and the request for use of version 2 at Time T2 is greater than a threshold value. The threshold value may be set to prevent simultaneous attempts to use the card where value would appear available to both versions for a single account. If the time is below the threshold value, it may be difficult to identify the version based on cross-comparison with the card service provider records and time of the transaction. As such, in some situations where there is potential overlap in time for use of the versions where either version could be matched with a time for a related card service provider identified transaction, one or more alternate tracking systems may employed to enable identification of the version being used.

Thus, if the time is greater than the threshold value, the method continues with the steps 706-714 as described above. In some examples, if the time is less than the threshold value then at least one of the versions may be disabled for use. For example, if the version 1 access request is received before the version 2 access request, then version 1 may be enabled and version 2 may be disabled. In some embodiments, version 1 and version 2 may be disabled.

If the time is less than the threshold value and the version cannot be identified by comparing the time of access of the shared virtual card (managed by the virtual card manager) and the time of the transaction (managed by the card service provider), then an alternate tracking system, as shown in FIG. 9 may be used. As such, the method may take additional steps to ensure identification of version 2. An example method is described in FIG. 9. Once the use of version 2 is enabled and confirmed and transaction history regarding the use is delivered, the method continues at 712 and 714.

Turning now to FIG. 9, an example method 722 for use in the method of FIG. 8 is further illustrated. This method may be used, in some embodiments, when two versions of a shared account are opened at the same merchant location. Geographic identification (described in FIG. 10) may not be effective due to geographic data limitations. Thus, FIG. 9 provides a secondary system to identify the version corresponding to the transaction. As described, in one example, the virtual card manager may disallow a second version of a card to be accessible by a second mobile device if it was opened by a prior device within a short span of time. As another alternative, in some systems, using periodic authentication as discussed in regards to FIG. 2, where only a single version may be authenticated at a time such that one version of a stored value card has the ability to enable the stored value with the processor and other devices would be incapable of enabling or disabling features until the periodic authentication from the prior requesting device expired. The version could be identified based on the device which is in an enabled and/or disabled state.

In other embodiments, the virtual card manger may request user input from the version card holder. Such input request avoids issues where multiple version holders want to use a card substantially simultaneously. For example, an input requirement avoids issues which may arise where multiple parties want to use their version of a shared card for lunch at the same time. The requested input may be related to the user version or to the transaction. For example, the input request may be a request for the value of the transaction which could then be cross-compared with the transaction data from the card service provider. Another example method may be through use of near field communication (NFC) or other communication platforms that can communicate the transaction data from the Point of Sale back to the virtual card. The virtual card manager could cross compare user feedback (whether manually or automatically returned) of transaction amount or other data to point the proper card version to the proper transaction as provided by the card service provider.

It should be appreciated that rules to handle the iterations where determining versioning may be handled differently depending on the merchant, the card service provider or other organization member bodies that are a part of the transaction process, such as VISA/MasterCard for an Open Loop transaction. It should also be appreciated that these methods can be used independently or together in a variety of arrangements.

Returning again to the example in FIG. 9, if the time between request for use of version 1 and version 2 is less than a threshold value, then the rules established by the goods and services systems on handling the verification processes are engaged, as indicated at 730. Engaged includes reviewing the rules to determine security measures for authenticating use.

At 732, the rules established by the card service provider or open loop administrative body are engaged. The rule set may be followed in the defined order to identify transaction versions, at 734.

Options for preventing simultaneous use may be provided. For example, at 736 the display and/or operation of version 2 may be delayed until the time threshold value is reached. Such delay ensures that the version of the stored value account being displayed will have distinct time stamps that can be properly matched with the card processor transaction data to determine which version of the card was used with which transaction. At 738, in some examples, user verification may be requested.

After the additional verifications and actions have occurred (e.g. steps 736 and 738 or others), the user of version 2 may be enabled after authentication of the original virtual card, at 740. Said in another way, if the verification rules are satisfied, use of version 2 may be enabled after authentication of the original virtual card. At 742, the virtual card manager may retrieve transaction history form the card service provider. The method then continues in regards to FIG. 8 as described above.

A second alternate tracking system is provided in FIG. 10. Although this tracking system may be used as the primary tracking system, the tracking system may also be used in situations where two or more versions of a shared virtual card are used at the same time from two different locations of a merchant. In such systems, as described below, geographical identification of the version of the shared virtual card location may be received and cross-compared with the card service provider data (regarding transaction location) to determine which card was likely used.

Specifically, FIG. 10 provides another example method, at 800, including steps to identify use of a select version of a virtual card. As shown, the method starts with correlating time and date stamps to match version 1 (managed by the virtual card manager) with transaction 1 (managed by card service provider) and version 2 (managed by the virtual card manager) with transaction 2 (managed by card service provider), as shown at 802. In some systems, geographic data may be available, indicated at 804. If geographic data is available, the geographic identifiers may be cross-compared. For example, at 806, the geographic identifiers from the transaction links from the card service provider (location of merchant store) are compared with geographic identifiers returned from the user device using a version of a shared virtual card.

Geographic identifiers for user mobile computing device are discussed in more detail in U.S. application Ser. No. 12/565,694 filed Sep. 23, 2009 entitled SYSTEMS AND METHODS FOR MANAGING A VIRTUAL CARD BASED ON GEOGRAPHICAL INFORMATION, inventor David A. Nelsen, the entire contents of which are hereby incorporated herein by reference for all purposes.

If the version geographic identifiers match with the transaction location data (at 808), then the user returned data is cross-compared with the user device identifying the transaction and the version at 810. It is noted that if geographic data is not available, at 804, or if the version does not match the transaction, at 808, then other methods may be used to determine if the version matches with the transaction. Specifically, at 812, the method may include executing additional comparison analysis to match the version with the transaction.

In regards to use of the geographical identifiers, controls may be issued on a virtual card or a shared virtual card based on these geographical identifiers. These controls may be provided by the card service provider, the goods and services system or the user of the virtual card (or the shared virtual card or version in some systems). For example, a merchant may place controls or limitations based on geographical location information, a parent card holder may place limitations based on geographical location information, a government body may be the originator of limitations, etc. Whereas it is typical that usage limitations on stored value are typically managed at the goods and services system, the virtual card manager can also use the controls based on geographic location information. Non-limiting examples of controls based on geographic location information that may be used with the virtual card system: parent/child relationships, employee/employer relationships, government use of stored value, pharmaceutical and special use stored value, promotional card by merchant, etc.

In the example of the parent/child relationship, a parent could provide use controls based on geographic location information. For example, the parent could define that an Open Loop or Closed Loop stored value card not be used downtown because they do not want their child to go downtown. Use characteristics of the child's version of that stored value card would require that the child computing device include global positioning to be enabled for use and that the card must be used in a region other than downtown.

Thus, in one example, a parent may determine to share a version of a shared virtual card with a child. In addition to sharing the version of the virtual card, the parent may also provide controls on the version. The parent may be able to manage the settings to ensure reporting and notifications regarding the child's use of the version. In use, a child may present and access the version of the virtual card. Through periodic authentication or other system, the stored value of the card may be turned on. The virtual card manager can turn the value of the card on with the card service provider. The virtual card manger can monitor the card service provider through checks to determine if a transaction has occurred with the respective account. If a transaction did occur, the virtual card manager can receive data from the child's computing device regarding where the child was and translating the information back to a database of store location identifiers. Reports can be generated for the parent based on the child's use, virtual card's location at time of use, as well as transaction information from the card service provider and/or the virtual card manager.

In the example of employee and employer relationships, an employer may use controls based on geographic location for a shared virtual value card. For example, the employer may create a single stored value account that all employees use. The employer may be able to identify which locations the card can be used from either Open or Closed Loop ensuring that employees are following proper company protocol. Furthermore, the employer may be able to track through a report or notification system which employee used the stored value account, when, and where. The employers further may be able to manage the employee's versions from a single account, or possibly create multiple accounts with one card where they use geographical positioning to identify these characteristics through the systems described above.

As another example, government use may include controls on stored value such that the stored value is only available in a select location. For example, in some embodiments, the stored value may only be used along a Train Line.

As another example, geographic controls may be used by pharmaceutical and other special use stored value types. Thus, controls may be applied which limit use to specific geographic regions. By using a combination of geographic controls, periodic authentication and shared virtual card and versions, tight controls can be used to prevent unauthorized use or enablement.

As another example, promotional opportunities may be provided based on the geographic controls. For example, a merchant may define special promotional cards based on geographic identifiers from virtual cards. Such promotions may be released to respective virtual card users (and version users, if any).

The systems and methods described herein allow a user to easily and securely share and create versions from a shared virtual card. The versions may be tracked through a virtual card manager corresponding to a single stored value account from the card service provider. Security features and controls may be provided to the shared virtual cards. Further, systems and methods may be applied to ensure tracking of the versions of a shared virtual card. Moreover, in some embodiments, systems and methods which use geographic identifiers may be used to further enable control functions for a virtual card and/or a shared virtual card or versions thereof It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The invention claimed is:

1. A method for sharing a virtual card facilitated by a virtual card manager operating on a central processing computer in selective communication with a plurality of card service providers, the method comprising:
  receiving an electronic communication at the virtual card manager from a first computing device comprising a request for sharing a virtual card provided by a specific card service provider, the specific card service provider being one of the plurality of card service providers;
  creating at the virtual card manager a first version and a second version of the virtual card, wherein:

each of the first version and the second version have a different identification number and each is recognized as independent virtual cards;

the first version is associated with a first set of privileges, and the second version is associated with a second set of privileges; and the first version and the second version are saved in a database communicatively connected to the virtual card manager, and wherein the specific card service provider is unaware of the first version and second version;

applying by the virtual card manager selected shared settings received from the first computing device and saved in the database to the first version and the second version;

delivering in a first electronic communication the first version from the virtual card manager to the first computing device;

delivering in a second electronic communication the second version from the virtual card manager to a second computing device; and wherein use of the first and second versions are managed by the virtual card manager and not by the specific card service providers.

2. The method of claim 1, further comprising:

receiving the first version at a virtual card engine of the first computing device; and receiving the second version at a virtual card engine of the second computing device.

3. The method of claim 1, further comprising: after creating, modifying card data in an associative card profile at the virtual card manager.

4. The method of claim 1, further comprising: maintaining card data and stored value account for the shared virtual card at the card service provider.

* * * * *